US009779009B2

United States Patent
Suzuki et al.

(10) Patent No.: US 9,779,009 B2
(45) Date of Patent: Oct. 3, 2017

(54) SOURCE CODE EQUIVALENCE VERIFICATION DEVICE AND SOURCE CODE EQUIVALENCE VERIFICATION METHOD

(71) Applicant: Hitachi, Ltd., Tokyo (JP)

(72) Inventors: Yasufumi Suzuki, Tokyo (JP); Daisuke Shimbara, Tokyo (JP); Makoto Ichii, Tokyo (JP); Hideto Noguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/910,370

(22) PCT Filed: Aug. 28, 2013

(86) PCT No.: PCT/JP2013/072946
§ 371 (c)(1),
(2) Date: Feb. 5, 2016

(87) PCT Pub. No.: WO2015/029154
PCT Pub. Date: Mar. 5, 2015

(65) Prior Publication Data
US 2016/0179653 A1 Jun. 23, 2016

(51) Int. Cl.
G06F 9/44 (2006.01)
G06F 11/36 (2006.01)
G06F 9/45 (2006.01)

(52) U.S. Cl.
CPC ............ *G06F 11/3608* (2013.01); *G06F 8/40* (2013.01); *G06F 8/427* (2013.01); *G06F 8/436* (2013.01); *G06F 8/4436* (2013.01); *G06F 8/72* (2013.01)

(58) Field of Classification Search
CPC ............ G06F 8/40; G06F 8/436; G06F 8/427; G06F 8/4436
(Continued)

(56) References Cited

U.S. PATENT DOCUMENTS 3,711,863 A * 1/1973 Bloom ................ G06F 11/3604
714/38.1
6,851,105 B1 * 2/2005 Coad ........................ G06F 8/20
717/106
(Continued)

OTHER PUBLICATIONS

Gayathri Muthukrishnan, "Basic Automatic Code Refactoring by a Parser Tool", 2010.*
(Continued)

*Primary Examiner* — Phillip H Nguyen
(74) *Attorney, Agent, or Firm* — Mattingly & Malur, PC

(57) ABSTRACT

When verifying rapidly the equivalence between source codes with respect to refactoring, the present invention performs two types of verification: verification based on structural comparison using structure graphs obtained by analyzing the source codes, and verification based on symbolic execution. If the structural comparison using the structure graphs can verify that the structures are identical with each other, then symbolic execution is not performed. Further, before the verification based on the structural comparison, the structure graphs of the source codes before and after refactoring are normalized on the basis of normalization information, which is defined for each refactoring pattern, and thereby adjusted so that the resulting structures are identical with each other when the refactoring is valid. Further, the structure graphs before and after the refactoring are subjected to abstraction before being subjected to symbolic execution for verification, thereby limiting locations to which symbolic execution is to be applied.

10 Claims, 27 Drawing Sheets

(58) Field of Classification Search
USPC .......................................... 717/142–144, 159
See application file for complete search history.

(56) References Cited

U.S. PATENT DOCUMENTS

| | | | | |
|---|---|---|---|---|
| 8,689,191 | B2* | 4/2014 | Dolby | ............................ 717/136 |
| 9,471,304 | B1* | 10/2016 | Fuchs | ........................ G06F 8/71 |
| 9,535,664 | B1* | 1/2017 | Foster | ......................... G06F 8/30 |
| 2005/0166193 | A1* | 7/2005 | Smith | ........................ G06F 8/75 |
| | | | | 717/143 |
| 2006/0041873 | A1* | 2/2006 | Pandarinathan | .......... G06F 8/71 |
| | | | | 717/141 |
| 2007/0033576 | A1 | 2/2007 | Tillmann et al. | |
| 2008/0172660 | A1* | 7/2008 | Arning | ...................... G06F 8/33 |
| | | | | 717/144 |
| 2011/0138362 | A1* | 6/2011 | Keidar-Barner | .... G06F 9/44589 |
| | | | | 717/126 |
| 2012/0150536 | A1* | 6/2012 | Dognin | ................. G10L 15/144 |
| | | | | 704/231 |

OTHER PUBLICATIONS

Jurgen Jordanus Vinju, "Analysis and Transformation of Source Code by Parsing and Rewriting", 2005.*
Higo et al., "Refactoring Support Based on Code Clone Analysis", 2004.*
Ubayashi et al., "Contract-based Verification for Aspect-oriented Refactoring", 2008.*
International Search Report of PCT/JP2013/072946.
Tom Mens et al., "Formalising Behaviour Preserving Program Transformations", Proceedings of the First International Conference on Graph Transformation, USA, 2002.
S. Person et al., "Differential Symbolic Execution", Proc. of ACM SIGSOFT Symposium on the Foundations of Software Engineering 2008, USA, 2008.
M. Fowler et al., "Refactoring: Improving the Design of Existing Code", inside front cover and pp. xvi-xvii, USA, Addison-Wesley Professional, 1 edition, Jul. 8, 1999.

* cited by examiner

FIG. 2

| 200 PROGRAM EQUIVALENCE VERIFICATION PROGRAM | |
|---|---|
| SOURCE CODE ANALYSIS MODULE | 201 |
| STRUCTURE GRAPH GENERATION/UPDATE MODULE | 202 |
| STRUCTURE GRAPH ANALYSIS MODULE | 203 |
| EXECUTION TREE GENERATION MODULE | 204 |
| SYMBOLIC EXECUTION IMPLEMENTATION MODULE | 205 |
| INPUT/OUTPUT MODULE | 206 |
| DATABASE MODULE | 207 |

FIG.11

C001
```
int global_var = 0;
int main(int argc, char **argv) {
    global_var = 10;
}
```

C002
```
int global_var = 0;
void foo() {
    global_var = 10;
}
int main(int argc, char **argv) {
    foo();
}
```

FIG. 15

C003
```
int a;
int b;
void foo() {
    a = 0;
    if (b < 0) {          ⎫
        b = 0;            ⎪
    } else {              ⎬ C005
        a = b;            ⎪
    }                     ⎭
    int x = bar();
    if (x < 0) {          ⎫
        a = a - x;        ⎪
    } else {              ⎬ C006
        a = a + x;        ⎪
    }                     ⎭
}
```

C004
```
int a;
int b;
void foo() {
    if (b < 0) {          ⎫
        b = 0;            ⎬ C007
    }                     ⎭
    int x = bar();
    if (x < 0) {          ⎫
        a = b - x;        ⎪
    } else {              ⎬ C008
        a = b + x;        ⎪
    }                     ⎭
}
```

F I G . 1 6
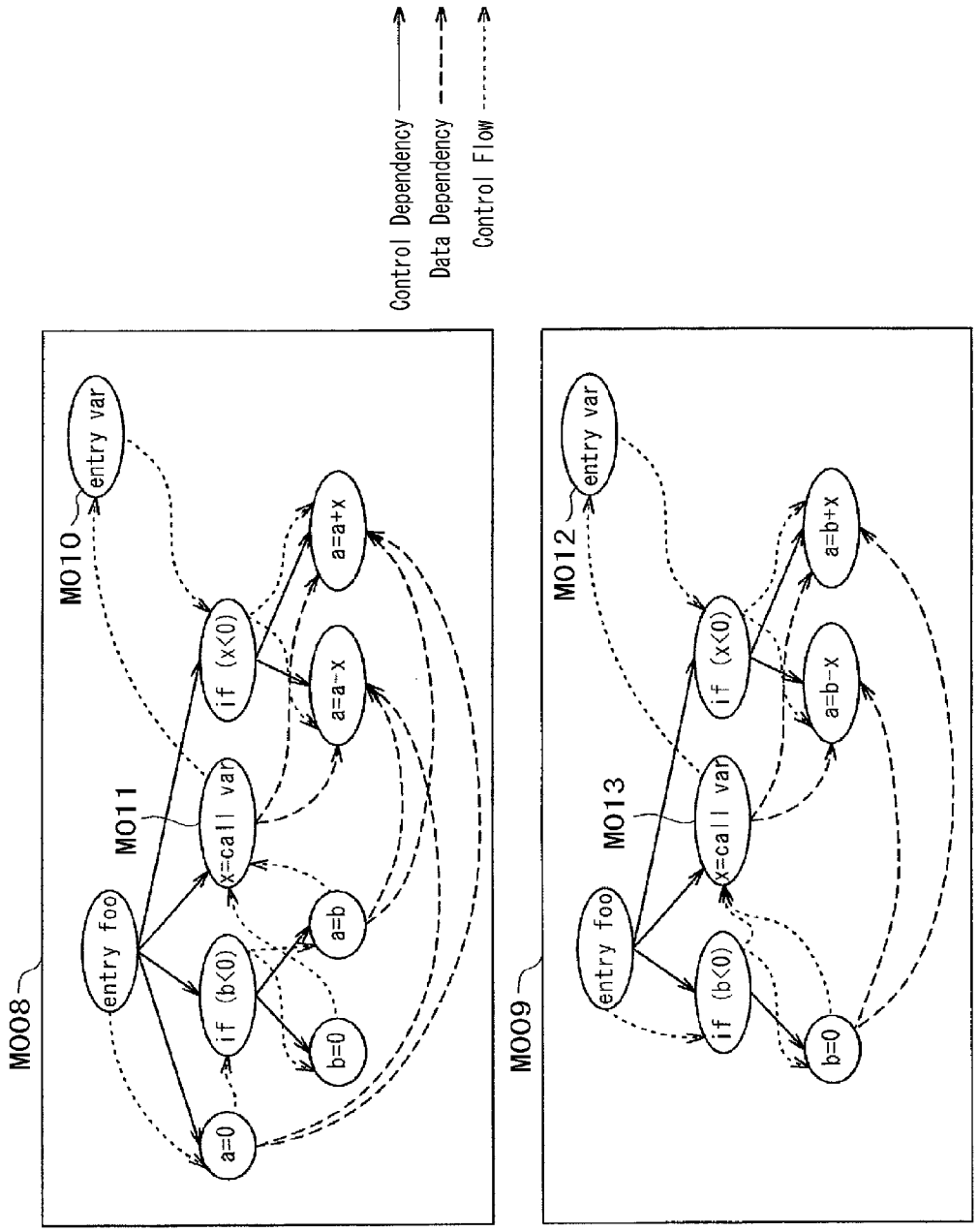

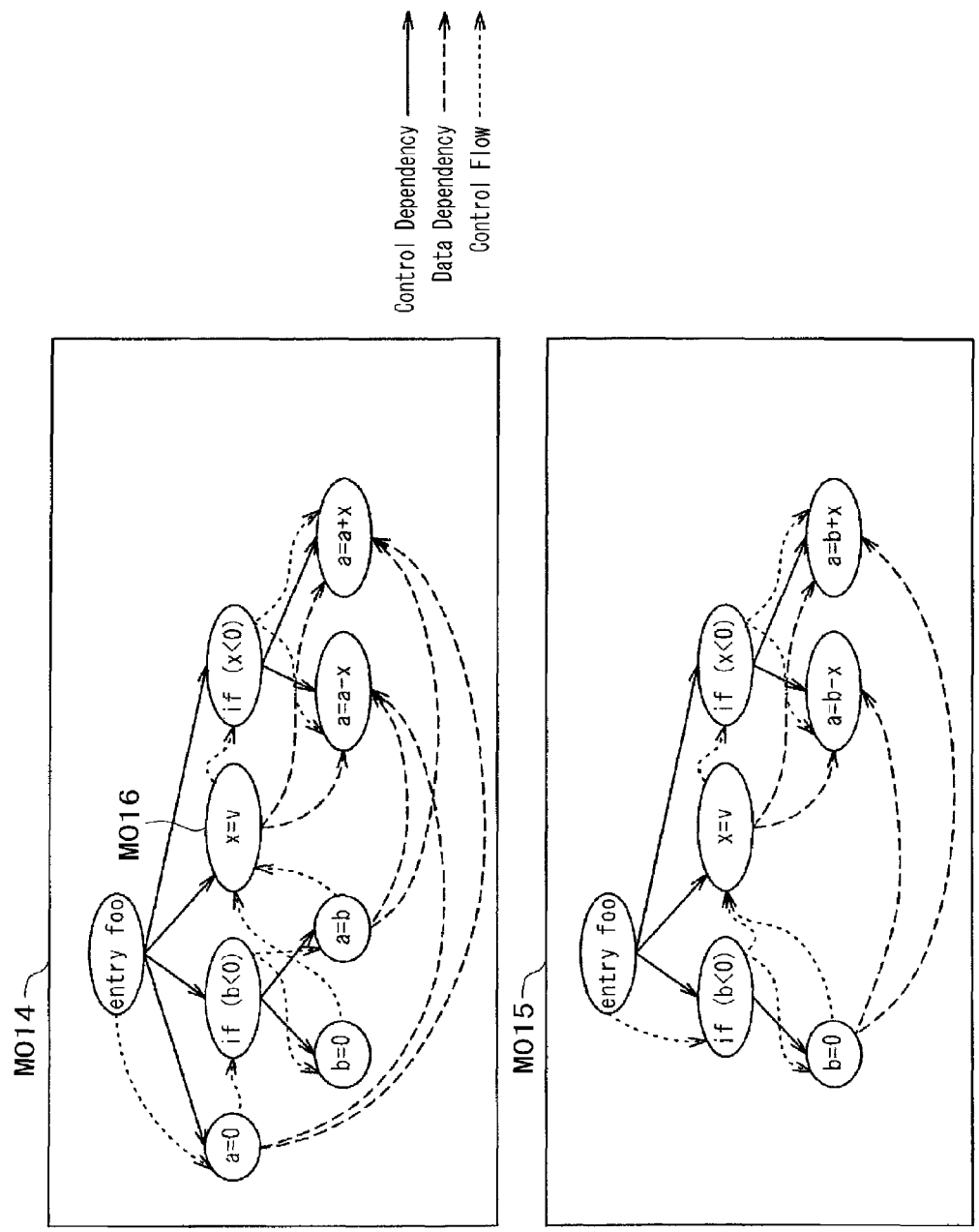

FIG.18
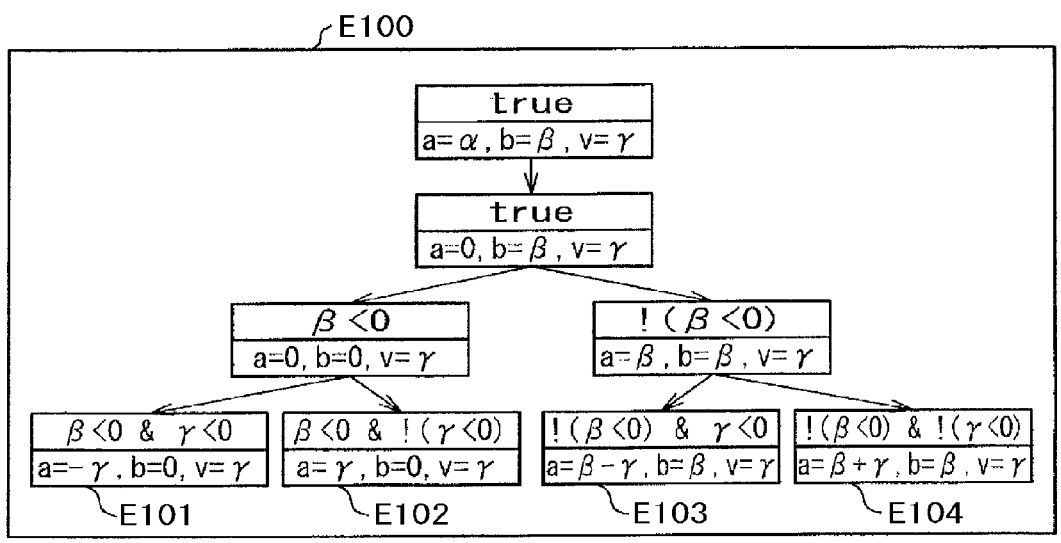
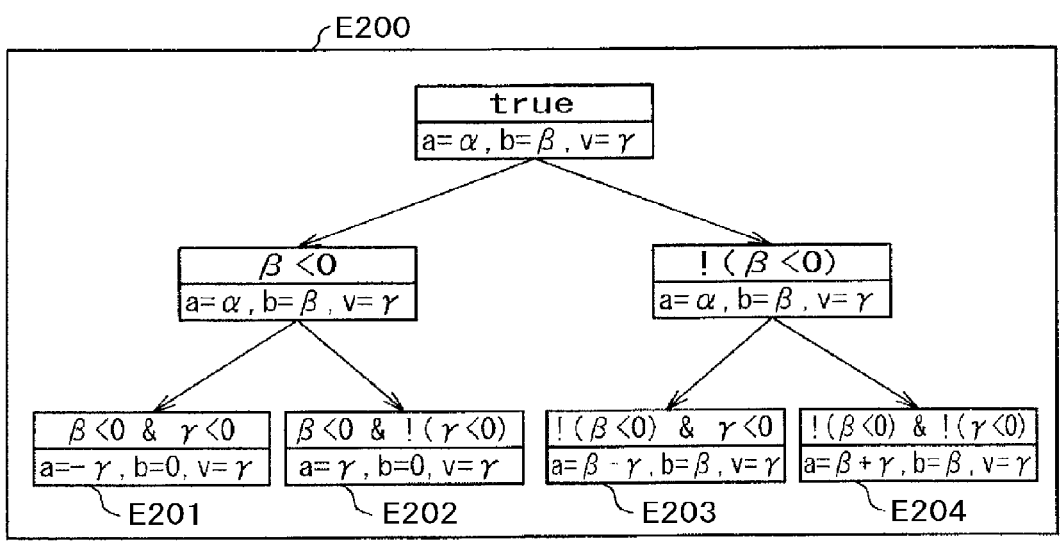

FIG. 21

C009
```
int a;
int b;
int c;
void foo1() {
    c = a + b;    ⎫ C011
    bar( c );    ⎭
    qux1( c );   ⎱ C012
}
void foo2() {
    c = a - b;   ⎫ C013
    bar( c );    ⎭
    qux2( c );   ⎱ C014
}
```

C010
```
int a;
int b;
int c;
void foo1() {
    baz(true);   ⎱ C015
    qux1( c );   ⎱ C016
}
void foo2() {
    baz(false);  ⎱ C017
    qux2( c );   ⎱ C018
}
void baz(boolean cond){
    if (cond) {       ⎫
        c = a + b;    ⎪
    } else {          ⎬ C019
        c = a - b;    ⎪
    }                 ⎭
    bar ( c );        ⎱ C020
}
```

FIG. 26
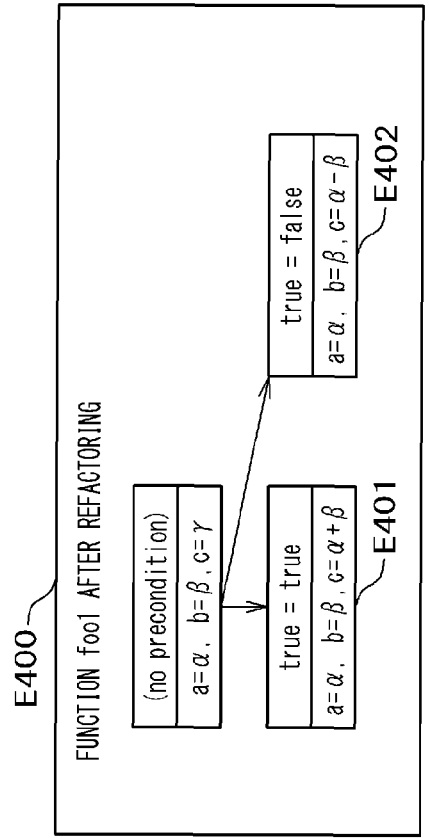
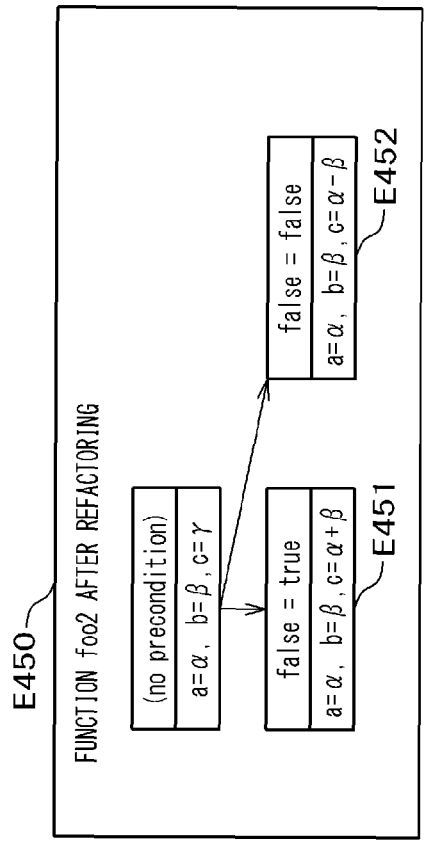
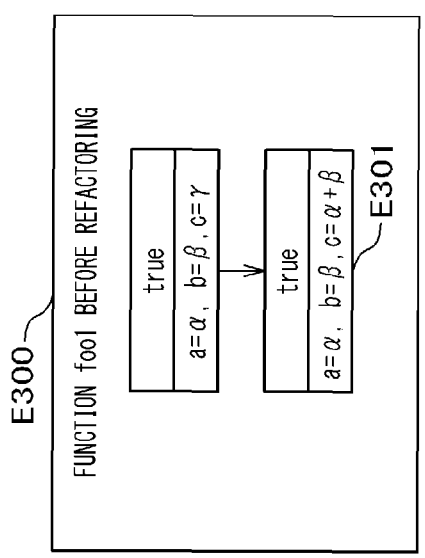
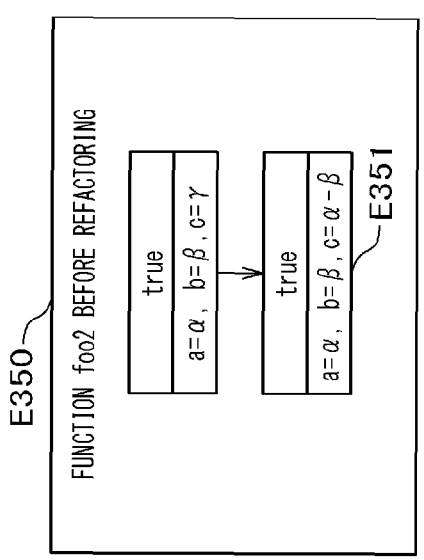

SOURCE CODE EQUIVALENCE VERIFICATION DEVICE AND SOURCE CODE EQUIVALENCE VERIFICATION METHOD

TECHNICAL FIELD

The present invention relates to a source code equivalence verification device and a source code equivalence verification method, and more particularly, to a source code equivalence verification device and a source code equivalence verification method, which are suitable for preventing an explosive increase in complexity and verifying validity of refactoring rapidly when verification as to whether or not programs are equivalent in behavior is performed by a symbolic execution technique in order to prevent an error from occurring due to execution of refactoring in refactoring of software.

BACKGROUND ART

In recent years, as information processing society has developed, a software system has penetrated general society, and very high reliability has been required in software. Meanwhile, software has been complicated and increased in size due to differential and derivative development, and a decrease in maintainability such as easy extension and easy understanding of software has become a problem.

Refactoring is a method disclosed in Non-Patent Documents 1 to 3, is a general term of a technique of improving a design quality of software by changing an internal structure without changing behavior of software, and reduces complexity and improves maintainability. The refactoring technique is a desired technique for securing maintainability of software that has been complicated and increased in size, but it is likely to lead to a new error since a source code is changed. Specifically, in the refactoring, there are methods classified as a plurality of patterns, and a change process of a source code and a condition for a source code for guaranteeing that behavior of software does not change by the change are explicitly or implicitly decided. When the source code is changed without following the change process or when the source code is changed without following the condition, since it is not guaranteed that behavior of software serving as a target does not change, an error is likely to occur in software. Thus, in a maintenance phase of software, a software developer may think that the refactoring may cause an error in software which is properly operating and thus decide not to perform the refactoring. For this reason, in the maintenance phase of software, in order to perform the refactoring actively, a technique of verifying that the refactoring causes no error is necessary.

In Non-Patent Document 3, 72 types of patterns of the refactoring (hereinafter, referred to simply as "refactoring patterns") which are typically used are defined.

In the present specification, when two source codes are identical in external behavior, that is, obtain the same output for the same input at the time of execution, both source codes are defined as being "equivalent," and verifying whether or not a source code before refactoring execution is equivalent to a source code after refactoring execution is referred to as "equivalence verification."

Conditions required by a technique of verifying whether or not the source code before refactoring execution is equivalent to the source code after refactoring execution include the following conditions.

(1) One condition is that most of the work has to be automated, and a manual work has to be small. In the past, equivalence of a source code has been verified by manual review or test. By implementing automatic verification by a tool, verification manhours are reduced, and the refactoring is promoted.

(2) Another condition is that when behaviors are determined to be equivalent or non-equivalent by the refactoring verification technique, information serving as a ground therefore has to be presented to the developer. By presenting information serving as a determination criterion to be easily understood by the developer, the developer can perform re-verification, reliability of a tool is improved, and the refactoring is promoted.

Examples of an equivalence verification technique include a technique disclosed in Patent Document 1 that tests portions that are determined to be different by a source code comparison and compares results thereof, a technique disclosed in Non-Patent Document 1 that represents a source code using a graph and verifies whether or not a graph satisfies a pre-condition that is decided for each refactoring, and technique disclosed in Non-Patent Document 2 that verifies whether or not behaviors are being held using symbolic execution.

CITATION LIST

Patent Document

Patent Document 1: US 2007/0033576 A

Non-Patent Document

Non-Patent Document 1: T. Mens, S. Demeyer, D. Janssens, "Formalising Behaviour Preserving Program Transformations," Proceedings of the First International Conference on Graph Transformation, USA, 2002

Non-Patent Document 2: S. Person, M. B. Dwyer, S. Elbaum, C. S. Pasareanu, "Differential Symbolic Execution," Proc. of ACM SIGSOFT Symposium on the Foundations of Software Engineering 2008, USA, 2008

Non-Patent Document 3: M. Fowler et al., "Refactoring: Improving the Design of Existing Code," inside front cover and pp. xvi-xvii, USA, Addison-Wesley Professional, 1 edition, Jul. 8, 1999

SUMMARY OF THE INVENTION

Problems to be Solved by the Invention

Non-Patent Document 1 discloses a technique of expressing a method call relation of a program by a graph and verifying whether or not a pre-condition decided for each refactoring is satisfied. In this approach, since verification of behavior is represented by structural verification, a manipulation of refactoring is defined for each refactoring, and conditions having no influence on behavior are covered. For this reason, practically, refactoring automated by a tool is essential, and there is a problem in that it is difficult to use a refactoring manipulation for verification of manual refactoring which may have an error.

Patent Document 1 discloses a method of generating a test case for a source code serving as a target using symbolic execution. Patent Document 1 further discloses a technique of generating a test case while suppressing an explosive increase in complexity of symbolic execution using different levels of abstractions. In order to apply this method to equivalence verification before and after refactoring, tests related to a non-refactored source code and a refactored source code are generated, the generated tests are executed on the source codes, and the results are verified. This does not need a special process at the time of execution of refactoring, but there are several problems. It has influence in a wide range according to a refactoring position, and it is unlikely to verify equivalence only through the generated tests. Further, even in verification of only a different portion that is not influenced, omission of verification is likely to occur according to a coverage of the test. The equivalence verification based on the test is imperfect due to a possibility of omission of verification or the like. Further, an executed test case is presented to the developer as the ground for determination of equivalence. However, there is a problem in that the developer hardly determines whether or not it is a sufficient test case based on only the enumerated test case.

Non-Patent Document 2 discloses a technique using symbolic execution as a technique of performing equivalence verification on a non-refactored source code and a refactored source code.

The symbolic execution refers to a technique of allocating a symbol instead of a numerical value as an input of a target program and analyzing behavior of a program comprehensively.

An exemplary symbolic execution will be described below with reference to FIG. 19.

FIG. 19 is a diagram illustrating a source code and a data structure derived therefrom to describe an exemplary symbolic execution.

In the symbolic execution, a value of an input variable is represented using a symbol called a symbolic variable, and how the symbolic variable is referred to and updated in a program is analyzed. Here, the symbolic execution is assumed to be performed on a function foo described in a source code E001 described by the C language. When the symbolic execution is performed on the source code E001 serving as the target of the symbolic execution, first, lexical analysis or syntax analysis is performed at the same time when a regular source code is compiled. As a result, a structure graph E002 including a control flow, a control dependency graph, and a data dependency graph extracted from the source code E001 is obtained. In the symbolic execution, an execution tree E020 is generated using the structure graph E002. Each of nodes in the execution tree E020 is configured with a path constraint represented by a symbolic variable for arriving at each node and a variable state in which a value of each variable at each node is represented by a symbolic variable. In the execution tree E020 of FIG. 19, the path constraint is represented on the upper portion of each node, and the variable state is represented on the lower portion thereof.

A process of generating the execution tree E020 will be described below in detail.

At the initiation stage of the symbolic execution, a symbolic variable is allocated to a variable serving as an input of a program in the source code E001. In the example of the source code E001, global variable a, b, and c are input variables, and symbolic variables $\alpha$, $\beta$, and $\gamma$ are allocated to the global variable a, b, and c, respectively. On the structure graph E002, in the initiation state corresponding to a node E003, the execution tree E020 becomes an execution tree configured with a single node E010. A path constraint E010a of the node E010 is true indicating that there is no constraint (a constraint for an arbitrary variable state is satisfied), and a variable state E010b indicates that symbolic variables corresponding to respective variables are equal according to an allocation of symbolic variables.

On the structure graph E002, a node E004 is executed after the node E003. Accordingly, also in the execution tree, a child node E011 of the node E010 is generated. In the child node E011, the path constraint E010a and the variable state E010b of the parent node E010 are copied as a path constraint E011a and the variable state E011b, and then the node E004 on the structure graph E002 is executed.

In the node E004, 0 is assigned to the variable a. Thus, in the variable state E011b of the node E011 of the execution tree, a state of the variable a is updated to 0 (zero) (a=0).

On the structure graph E002, a node executed after the node E004 is a node E005. In the node E005, the variable state is not updated, and thus no new node is generated in the execution tree. The node E005 is a conditional branch generated by if statement. Thus, in the control flow of the structure graph E002, two nodes, that is, a node E006 and a node E007 are next nodes. In the symbolic execution, in order to cover all available control flows, a child node according to each branch is generated in a conditional branch. In other words, a node E012 is generated as a child node of the node E011 in the execution tree in association with the node E006, and a node E013 is generated as a child node of the node E011 in the execution tree in association with the node E007.

A path constraint E012a of the node E012 in the execution tree is a logical product (AND) (& in FIG. 19) of the path constraint E011a of the parent node and the branch condition of the conditional branch. Since the branch condition in the node E005 is c<0, and from the variable state E011b, the symbolic variable of the variable c is $\gamma$, it is understood that a condition for generating a conditional branch is $\gamma<0$. In this regard, $\gamma<0$ which is a logical product of true and $\gamma<0$ is the path constraint E012a in the node E012.

Further, since the node E013 corresponds to when the branch condition of the conditional branch is not satisfied, the path constraint E013a of the child node E013 is a logical product of the path constraint E011a of the parent node and negation (NOT) (! in FIG. 19) of the branch condition of the conditional branch. In other words, ! ($\gamma<0$) which is a logical product between true and ! ($\gamma<0$) is the path constraint E013a of the child node E013.

The variable state E011b of the parent node E011 are copied as a variable state E012b of the child node E012 and a variable state E013b of the child node E013 of the node E011, and a calculation is continued. In the variable state E012b of the node E012, since 0 is assigned to the variable c in the node E006, the variable state of the variable c is updated to c=0. In the variable state E013b of the node E013, the value of the variable c is assigned to the variable a in the node E007. At this point in time, the variable state of the variable c is the symbolic variable $\gamma$, and thus in the variable state E013b, the variable state of the variable a is updated to a=$\gamma$.

Thereafter, the execution tree is generated by the same process as the above-described process. On the control flow, a node next to the node E006 is E008, the node E008 is a conditional branch, and thus two child nodes E014 and E015 are generated for the node E012 in the execution tree. The branch condition in the node E008 is (b<0), but the branch condition represented by the symbolic variable using the variable state E012b is ($\beta<0$). Thus, the path constraints of the child nodes E014 and E015 are a logical product of the path constraint E012a of the parent node E012 and (($\beta<0$) and a logical product of the path constraint E012a of the parent node E012 and ! ($\beta<0$), respectively. In the child node E014, a node E009a on the control flow is subsequently executed. The node E009a is a node in which a value of a−b is assigned to the variable a, and it is understood that the state of the variable a is 0 (zero), and the state of the variable b is β from the variable state, and thus the state of the variable a is updated to −β. In child node E015, a node E009b on the control flow is subsequently executed. The node E009b is a node in which a value of a+b is assigned to the variable a, and it is understood that the state of the variable a is 0 (zero), and the state of the variable b is β from the variable state, and thus the state of the variable a is updated to β.

On the control flow, a node next to the node E007 is E008, the node E008 is a conditional branch, and thus two child nodes E016 and E017 are generated for the node E013 in the execution tree. The branch condition in the node E008 is (b<0), but the branch condition represented by the symbolic variable using the variable state E013b is (β<0). Thus, the path constraints of the child nodes E016 and E017 are a logical product of the path constraint E013a of the parent node E013 and (β<0) and a logical product of the path constraint E013a of the parent node E013 and ! (β<0), respectively. In the child node E016, a node E009a on the control flow is subsequently executed. The node E009a is a node in which a value of a−b is assigned to the variable a, and it is understood that the state of the variable a is γ, and the state of the variable b is ρ from the variable state, and thus the state of the variable a is updated to γ−β. In child node E017, a node E009b on the control flow is subsequently executed. The node E009b is a node in which a value of a+b is assigned to the variable a, and it is understood that the state of the variable a is γ, and the state of the variable b is β from the variable state, and thus the state of the variable a is updated to γ+ρ.

When the control flow arrives at until the function ends for all the leaf nodes of the execution tree E020, generation of the execution tree ends. The execution tree E020 of FIG. 19 is an execution tree at a point in time at which the symbolic execution ends for the function foo. A collection of the leaf nodes of the execution tree at a point in time at which the symbolic execution ends is a result of the symbolic execution (this is referred to as a "symbolic execution summary"). An arbitrary combination of the symbolic variables α, β, and γ satisfies any one of the leaf nodes in the symbolic execution summary. It is possible to know a value of each variable after a program is executed from the value of the symbolic variable serving as an input using the variable state included in the node. For example, when all values of the variables a, b, and c before the function foo is executed are 1, the symbolic variables are 1 (α=β=γ=1), and satisfy the path constraint of the node E017. It is understood that the values of the variables a, b, and c after the function foo is executed are 2, 1, and 1 (a=γ+β=2, b=β=1, and c=γ=1) from the variable state of the node E017. As described above, it can be said that the symbolic execution is a calculation of covering control paths available for a program and obtaining a relation of variable values before and after a program is executed, that is, the symbolic execution summary serving as a collection of sets of a condition (a path constraints) of an input value and a states (a variable state) of an output variable.

When a logically equivalent symbolic execution summary is obtained by performing the symbolic execution on the structure graphs of the non-refactored source code and the refactored source code, that is, when the same output is obtained for the same input, the source code can be determined to be equivalent to each other as defined above. As described above, in the symbolic execution, since a series of behaviors performed by a target program is comprehensively analyzed, neither a coverage problem in verification using a test nor a tool dependency problem in verification of a pre-condition occurs. On the other hand, in a program having an iteration statement or a recursive structure, the execution tree is complicated, and the complexity is likely to diverge and explode. In order to suppress the complexity, it is necessary to limit the range of the symbolic execution or execution by the pre-condition, and the integrity of verification which is an advantage of the symbolic execution is lost.

In Non-Patent Document 2, by noticing a point in which there is a common portion between source codes to be compared, an attempt to reduce the complexity while keeping the integrity is made. The divergence of the complexity on the execution tree is prevented by representing an execution result of a common block that is not changed by a function (an uninterrupted function). However, there is a case in which the complexity on the execution tree for the different portions diverges, and thus there is a possibility that the complexity will explode. In addition, how to deal with a program having an interaction with an outside world such as hardware is not mentioned.

The present invention was made to solve the above problems, and it is an object of the present invention to provide a source code equivalence verification method in which when equivalence verification for refactoring which is manually performed is performed using the symbolic execution, the equivalence verification can be performed promptly without exploding the complexity.

Solutions to Problems

In order to solve the above problems, according to the present invention, a source code equivalence verification device verifies equivalence between an original source code and a source code after refactoring execution, and includes a source code input unit that receives a non-refactored source code and a refactored source code, a refactoring pattern input unit that receives refactoring pattern information of the source code, a source code information generating unit that performs lexical analysis and syntax analysis on each of the non-refactored source code and the refactored source code, converts the non-refactored source code and the refactored source code into structure graphs, and generates non-refactored source code information and refactored source code information, a normalizing unit that normalizes the non-refactored source code information and the refactored source code information with reference to normalization information defined for the refactoring pattern information, and generates normalized non-refactored source code information and normalized refactored source code information, a structure comparing unit that compares a structure of the normalized non-refactored source code information with a structure of the normalized refactored source code information, a symbolic execution unit that performs symbolic execution on the normalized non-refactored source code information and the normalized refactored source code information, and an equivalence determining unit that compares symbolic execution results obtained by the symbolic execution unit, and determines equivalence between the non-refactored source code and the refactored source code.

Further, in order to solve the above problems, according to the present invention, in the source code equivalence verification device, the structure comparing unit compares the structure graph of the normalized non-refactored source code information with the structure graph of the normalized refactored source code information, determines that the non-refactored source code and the refactored source code are equivalent when the structures are identical, and ends an equivalence verification process, and when the structures are determined to be not identical, a process of the symbolic execution unit is performed.

Further, in order to solve the above problems, according to the present invention, in the source code equivalence verification device, the normalizing unit includes a change position specifying unit that compares the non-refactored source code information with the refactored source code information with reference to change position specifying information defined for the refactoring pattern information, and generates change position information specifying a structural change position of the source code, the symbolic execution unit includes an abstracting unit that abstracts the normalized non-refactored source code information and the normalized refactored source code information with reference to the change position information of the non-refactored source code information and the refactored source code information extracted by the change position specifying unit and abstraction information defined for the refactoring pattern information, and the symbolic execution is performed on abstracted non-refactored source code information and abstracted refactored source code information generated by the abstracting unit.

Further, in order to solve the above problems, according to the present invention, a source code equivalence verification method of verifying equivalence between an original source code and a source code after refactoring execution includes a source code input step of receiving a non-refactored source code and a refactored source code, a refactoring pattern input step of receiving refactoring pattern information of the source code, a source code information generates step of performing lexical analysis and syntax analysis on each of the non-refactored source code and the refactored source code, converting the non-refactored source code and the refactored source code into structure graphs, and generating non-refactored source code information and refactored source code information, a normalization step of normalizing the non-refactored source code information and the refactored source code information with reference to normalization information defined for the refactoring pattern information, and generating normalized non-refactored source code information and normalized refactored source code information, a structure comparison step of comparing a structure of the normalized non-refactored source code information with a structure of the normalized refactored source code information, a symbolic execution step of performing symbolic execution on the normalized non-refactored source code information and the normalized refactored source code information, and an equivalence determination step of comparing symbolic execution results obtained by the symbolic execution step, and determining equivalence between the non-refactored source code and the refactored source code.

Effects of the Invention

According to the present invention, it is possible to provide a source code equivalence verification method in which when equivalence verification for refactoring which is manually performed is performed using the symbolic execution, the equivalence verification can be performed promptly without exploding the complexity.

BRIEF DESCRIPTION OF THE DRAWINGS

FIG. 2 is a software configuration diagram illustrating a source code equivalence verification device according to an embodiment of the present invention.

FIG. 11 is a (first) diagram illustrating examples of a non-refactored source code and a refactored source code.

FIG. 15 is a (second) diagram illustrating examples of a non-refactored source code and a refactored source code.

FIG. 16 is a (second) diagram illustrating an example of source code information of a non-refactored source code and a refactored source code.

FIG. 17 is a diagram illustrating an example of abstracted source code information.

FIG. 18 illustrates an example of an execution tree when symbolic execution is performed on a non-refactored source code and a refactored source code.

FIG. 21 is a (third) diagram illustrating examples of a non-refactored source code and a refactored source code.

FIG. 26 illustrates an example of an execution tree when abstraction is performed, and symbolic execution is performed on a non-refactored source code and a refactored source code.

MODE FOR CARRYING OUT THE INVENTION

Hereinafter, exemplary embodiments of the present invention will be described with reference to the appended drawings.

First Embodiment

Hereinafter, a configuration and a process of a source code equivalence verification device 1000 according to an embodiment of the present invention will be described with reference to FIGS. 1 to 10.

First, a hardware configuration of a source code equivalence verification device according to an embodiment of the present invention will be described with reference to FIG. 1.

Figure 1:
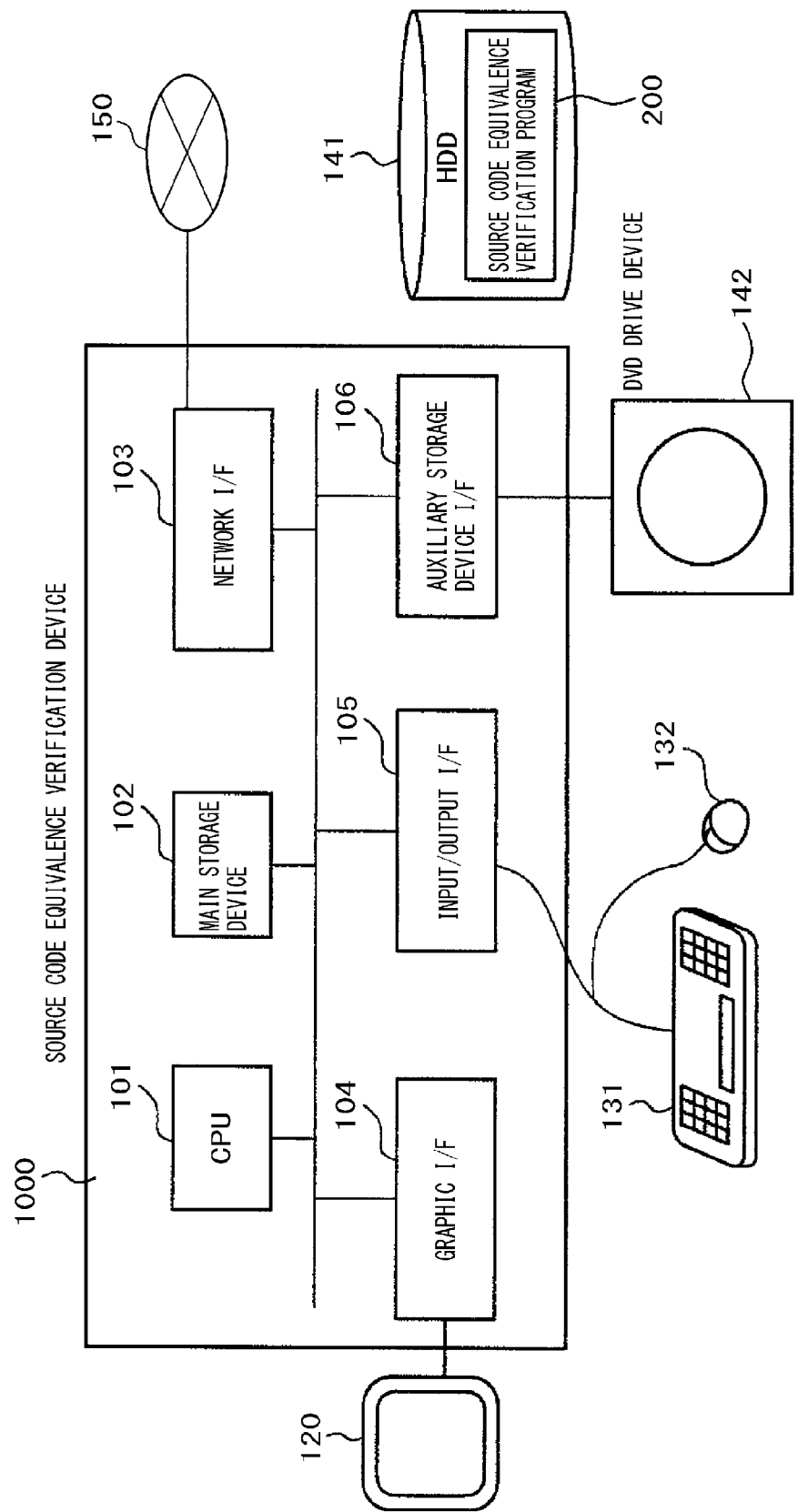
FIG. 1 is a hardware configuration diagram illustrating a source code equivalence verification device according to an embodiment of the present invention.

For example, the hardware configuration of the source code equivalence verification device according to an embodiment of the present invention is implemented by a general personal computer (PC) illustrated in FIG. 1. The source code equivalence verification device 1000 has a form in which a central processing unit (CPU) 101, a main storage device 102, a network I/F 103, a graphic I/F 104, an input/output I/F 105, and an auxiliary storage device I/F 106 are connected with one another via a bus.

The CPU 101 controls the respective units of the source code equivalence verification device 1000, loads a source code equivalence verification program 200 onto the main storage device 102, and executes the source code equivalence verification program 200.

The main storage device 102 is typically configured with a volatile memory such as a RAM, and a program executed by the CPU 101 and data referred to by the CPU 101 are loaded from the auxiliary storage device or the like and stored in the main storage device 102.

The network I/F 103 is an interface for a connection with the external network 150.

The graphic I/F 104 is an interface for a connection with a display device 120 such as a liquid crystal display (LCD).

The input/output I/F 105 is an interface for a connection with an input/output device. In an example of FIG. 1, a keyboard 131 and a mouse 132 of a pointing device are connected.

The auxiliary storage device I/F 106 is an interface for a connection with an auxiliary storage device such as a hard disk drive (HDD) 141 or a digital versatile disk (DVD) drive device 142.

The HDD 141 has a large storage capacity, and stores the source code equivalence verification program 200 for carrying out the present embodiment.

The DVD drive device 142 is a device that writes data in an optical disk such as a DVD or a CD or reads data from an optical disk, and for example, the source code equivalence verification program 200 may be provided by a CD-ROM and installed.

The source code equivalence verification device 1000 of the present embodiment installs the source code equivalence verification program 200 in the PC and executes each function.

Next, a software configuration of the source code equivalence verification device according to an embodiment of the present invention will be described with reference to FIG. 2.

A module configuration of the program equivalence verification program 200 executed by the source code equivalence verification device 1000 includes a source code analysis module 201, a structure graph generation/update module 202, a structure graph analysis module 203, an execution tree generation module 204, a symbolic execution implementation module 205, an input/output module 206, and a database module 207, which are subroutines.

The program equivalence verification program 200 is application software operating on an operating system (OS), and an OS and a library program are included as a software configuration of the source code equivalence verification device but not illustrated in FIG. 2.

The source code analysis module 201 is a module that performs lexical analysis and syntax analysis of a source code and extracts information necessary for generating a structure graph.

The structure graph generation/update module 202 is a module that generates or updates the structure graph based on an analysis result of the source code analysis module 201.

The structure graph analysis module 203 is a module that analyzes the graph structure of the structure graph.

The execution tree generation module 204 is a module that generates the execution tree based on an analysis result of the structure graph analysis module 203.

The symbolic execution implementation module 205 is a module that performs the symbolic execution on the execution tree generated by the execution tree generation module 204.

The input/output module 206 is a module that receives or outputs necessary data from or to the outside.

The database module 207 is a module that accesses various kinds of databases.

Figure 3:
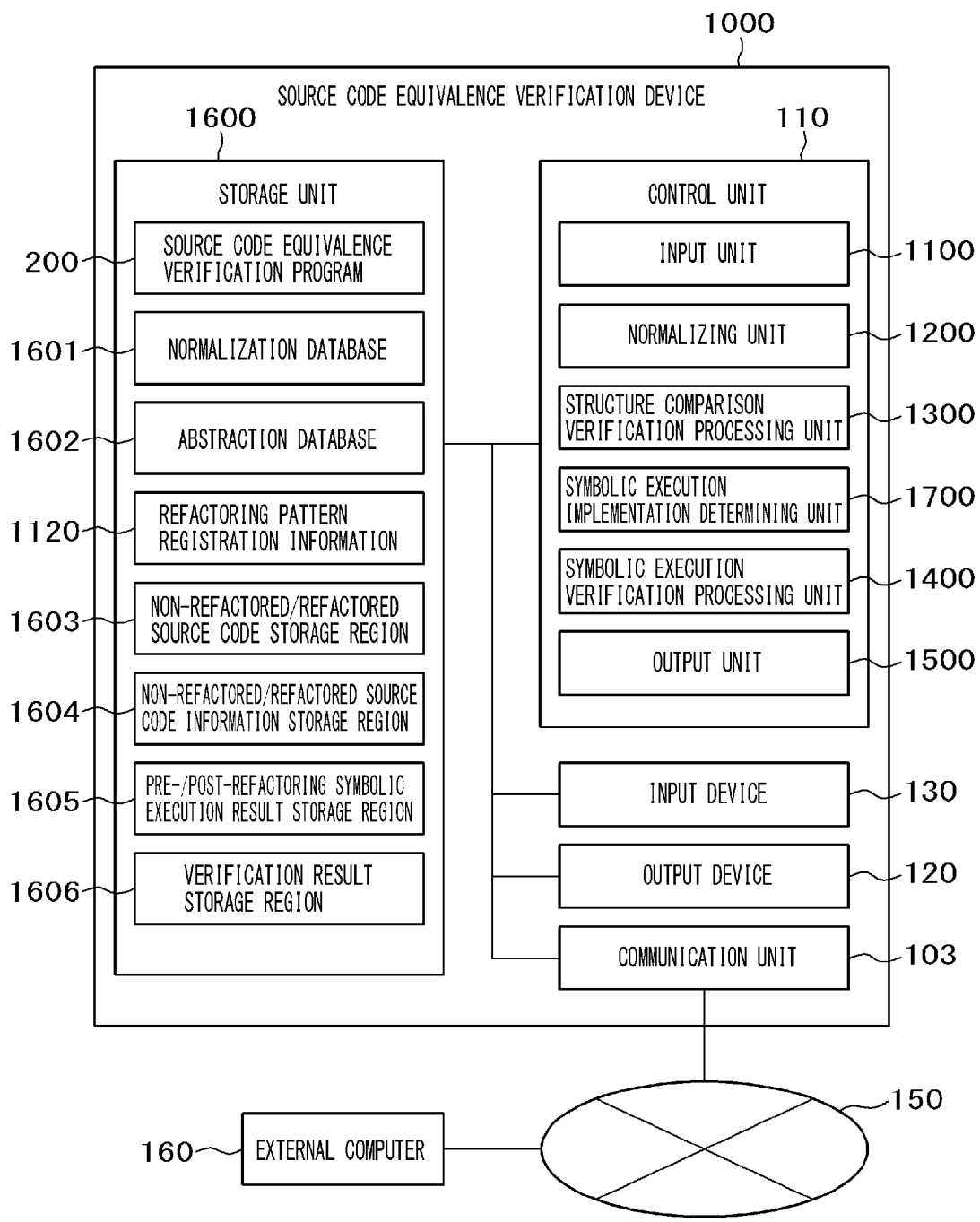
FIG. 3 is a functional configuration diagram illustrating a source code equivalence verification device according to an embodiment of the present invention.

FIG. 3 illustrates a functional configuration diagram of the source code equivalence verification device 1000. A control unit 110 is configured with the CPU 101 and the main storage device 102 of FIG. 1, and the storage unit 1600 is mainly configured with the HDD 141 of FIG. 1 and may include the main storage device 102. An input device 130 includes the input/output I/F 105, the keyboard 131, and the mouse 132 of FIG. 1 and may further include a component that performs reading on the DVD drive device 142 through the auxiliary storage device I/F 106. An output device 120 includes the graphic I/F 104, the display device 120, and the like and may further include a component that performs writing on the DVD drive device 142 through the auxiliary storage device I/F 106. A communication unit 103 indicates the network I/F 103 of FIG. 1 and is connected with, for example, an external computer 160 via a network 150.

The storage unit 1600 previously stores the source code equivalence verification program 200, refactoring pattern registration information 1120 in which a type of refactoring corresponding to the present device is registered in advance, a normalization database 1601 in which a normalization process performed on non-refactored/refactored source code information is registered for each refactoring pattern in advance, and an abstraction database 1602 in which an abstraction process performed on the non-refactored/refactored source code information is registered for each refactoring pattern in advance.

The storage unit 1600 further includes a non-refactored/refactored source code storage region 1603, a non-refactored/refactored source code information storage region 1604, a pre-/post-refactoring symbolic execution result storage region 1605, and a verification result storage region 1606, which are secured when the source code equivalence verification process is performed.

The control unit 110 implements the respective functions of an input unit 1100, a normalizing unit 1200, a structure comparison verification processing unit 1300, a symbolic execution implementation determining unit 1700, a symbolic execution verification processing unit 1400, and an output unit 1500 by loading the source code equivalence verification program 200 from the storage unit 1600 and executing the source code equivalence verification program 200 through the CPU 101.

Next, the functions and a process of the source code equivalence verification device according to an embodiment of the present invention will be described with reference to FIGS. 4 to 10.

Figure 4:
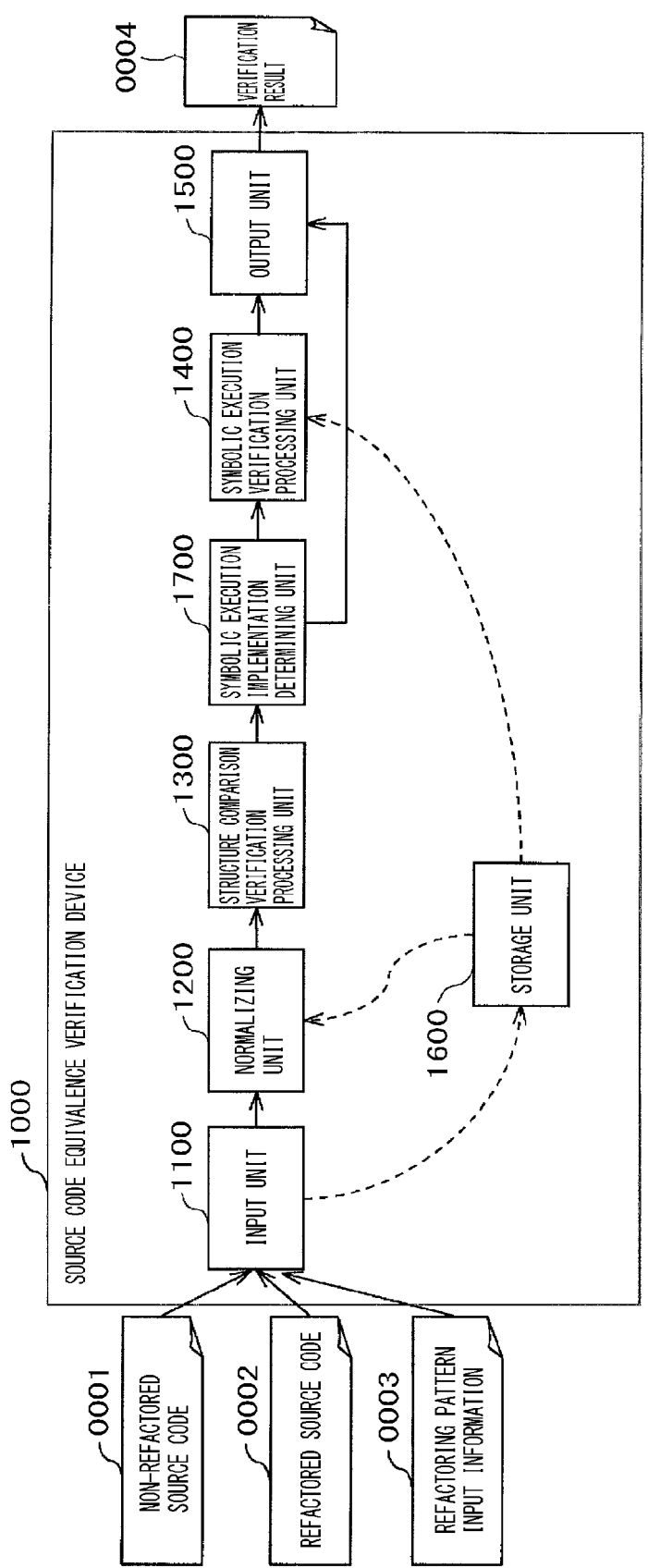
FIG. 4 is a diagram illustrating an overall function and a data flow of a source code equivalence verification device according to an embodiment of the present invention.

FIG. 4 is a diagram illustrating an overall function and a data flow of the source code equivalence verification device according to an embodiment of the present invention.

Figure 5:
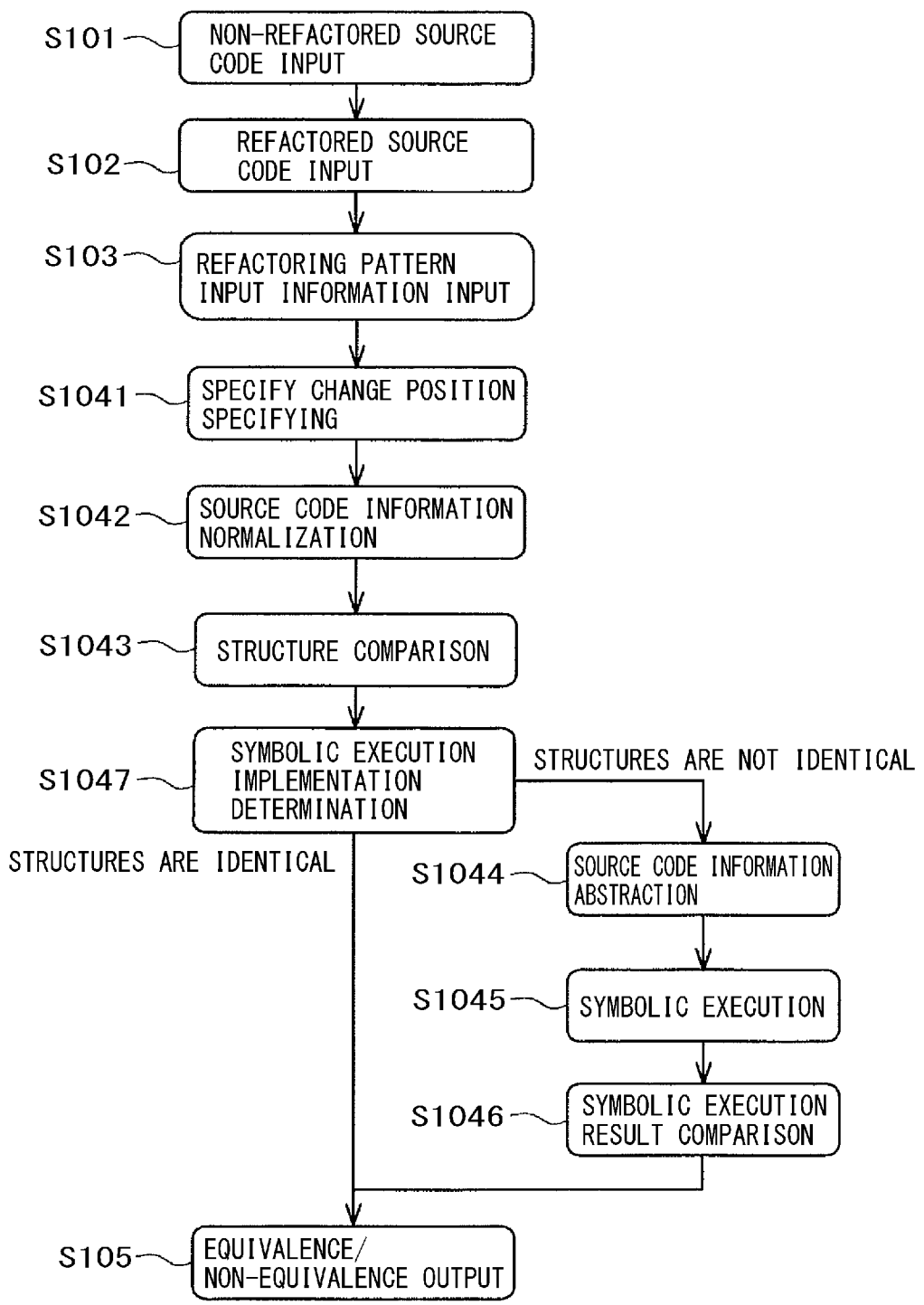
FIG. 5 is a flowchart illustrating a process of a source code equivalence verification device according to an embodiment of the present invention.

FIG. 5 is a flowchart illustrating a process of the source code equivalence verification device according to an embodiment of the present invention.

Figure 6:
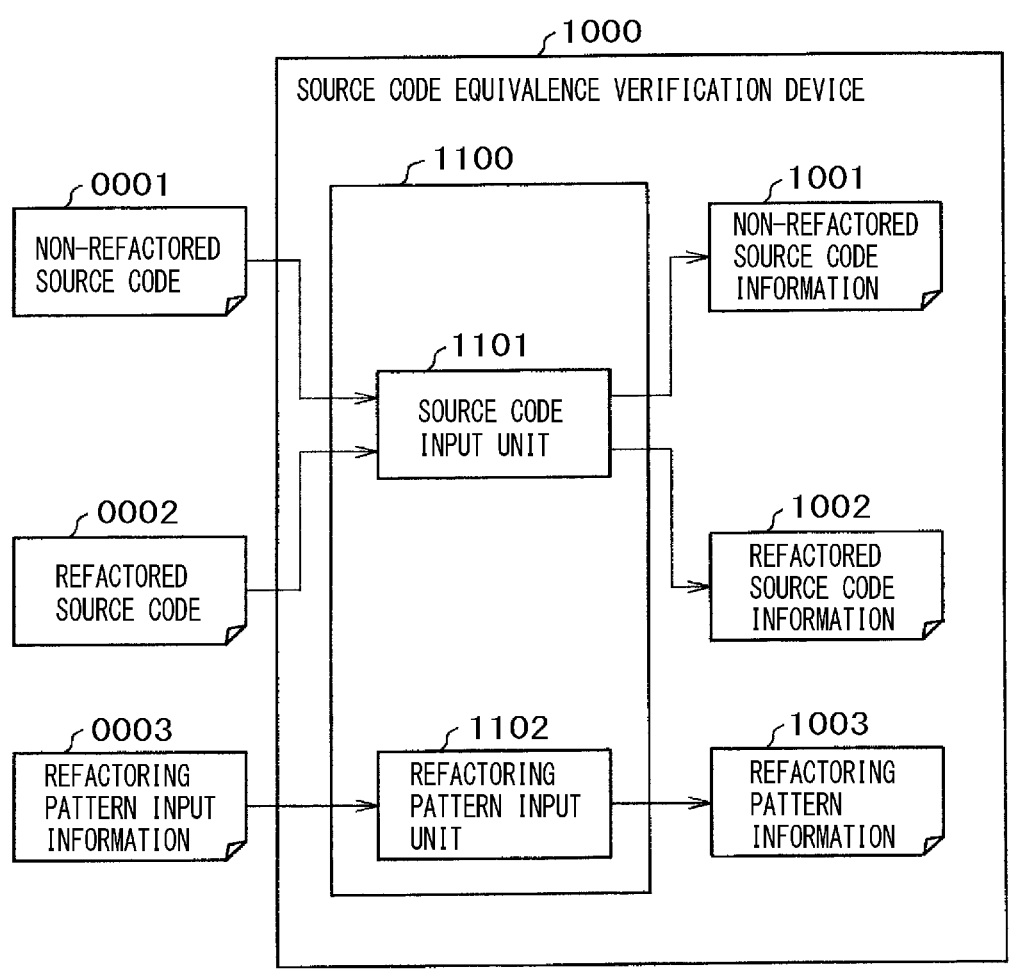
FIG. 6 is a diagram illustrating a detailed function and a data flow of an input unit 1100.

FIG. 6 is a diagram illustrating a detailed function and a data flow of the input unit 1100.

Figure 7:
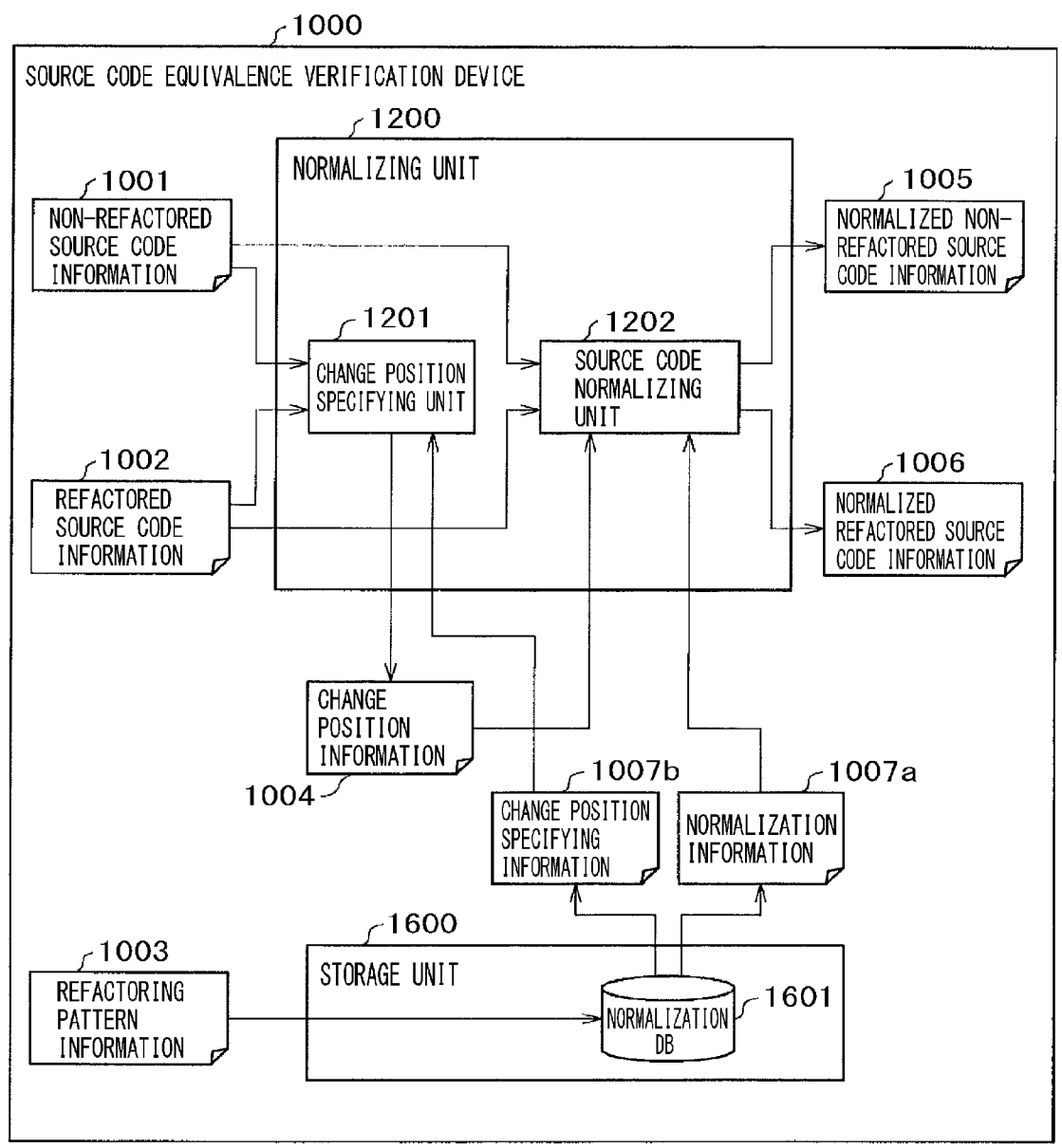
FIG. 7 is a diagram illustrating a detailed function and a data flow of a normalizing unit 1200.

FIG. 7 is a diagram illustrating a detailed function and a data flow of the normalizing unit 1200.

Figure 8:
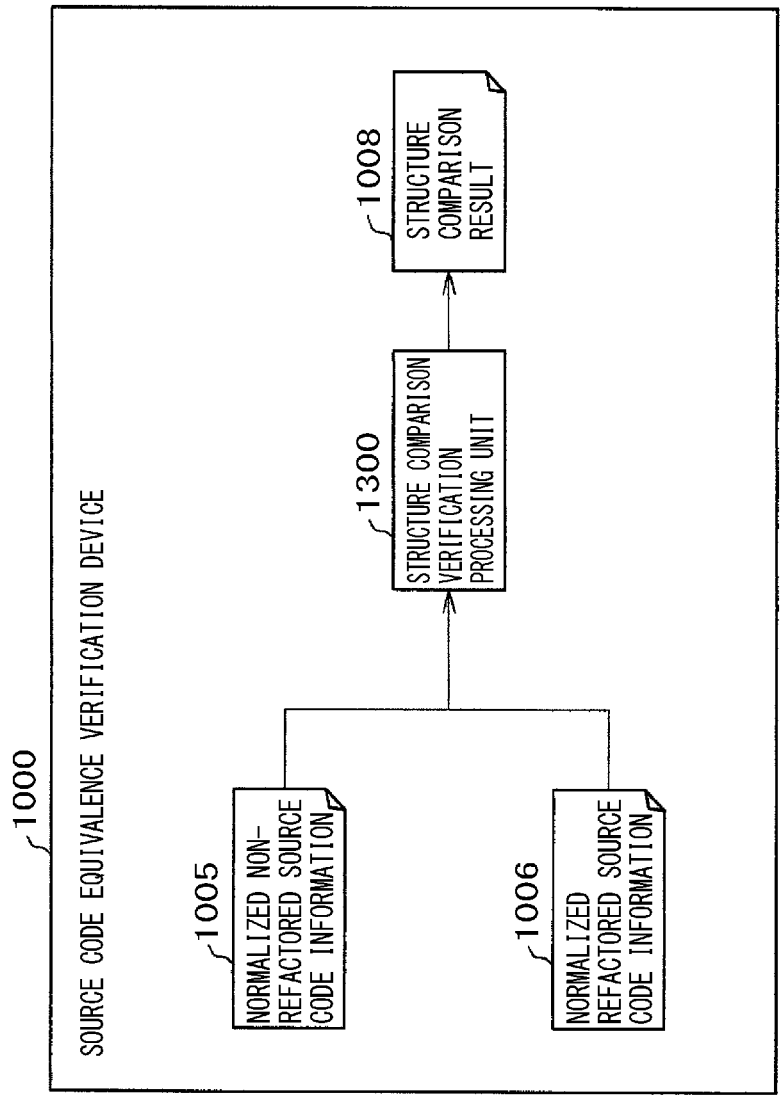
FIG. 8 is a diagram illustrating a detailed function and a data flow of a structure comparison verification processing unit 1300.

FIG. 8 is a diagram illustrating a detailed function and a data flow of the structure comparison verification processing unit 1300.

Figure 9:
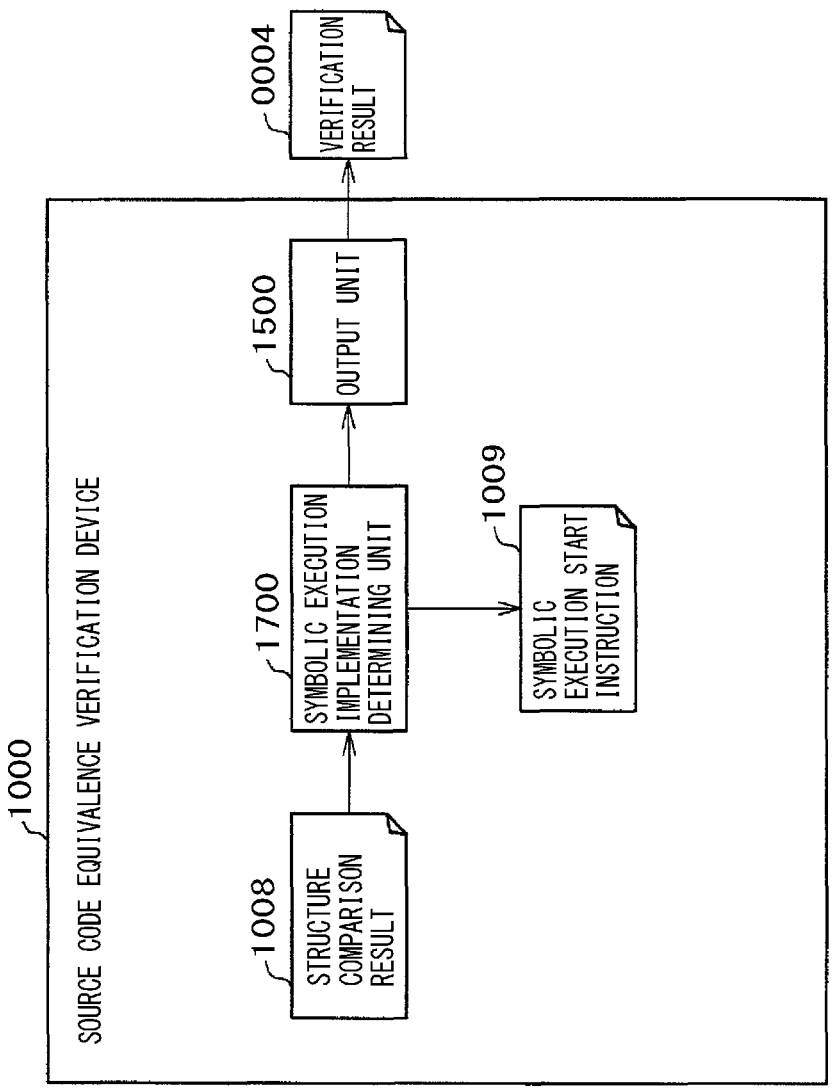
FIG. 9 is a diagram illustrating a detailed function and a data flow of a symbolic execution implementation determining unit 1700.

FIG. 9 is a diagram illustrating a detailed function and a data flow of the symbolic execution implementation determining unit 1700.

Figure 10:
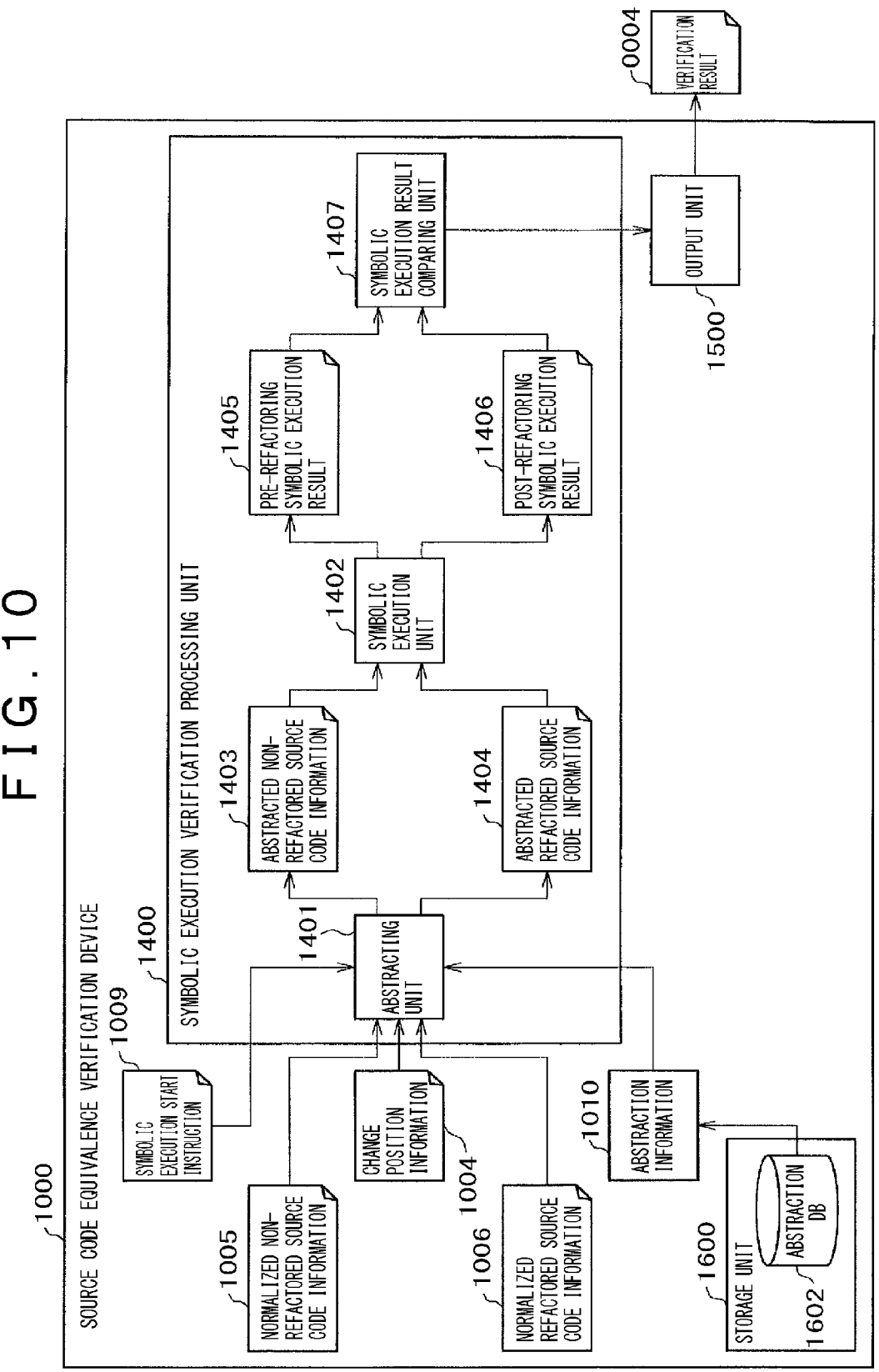
FIG. 10 is a diagram illustrating a detailed function and a data flow of a symbolic execution verification processing unit 1400.

FIG. 10 is a diagram illustrating a detailed function and a data flow of the symbolic execution verification processing unit 1400.

The software developer transmits the non-refactored/refactored source code to the source code equivalence verification device 1000 via the network 150 and requests the source code equivalence verification device 1000 to verify the non-refactored/refactored source code in order to perform refactoring on software created by a software development device installed in the external computer 160 and verify whether or not a source code after refactoring execution is equivalent to a source code before refactoring execution. The requested non-refactored/refactored source code is stored in the non-refactored/refactored source code storage region 1603 of the storage unit 1600 and undergoes the equivalence verification process.

Alternatively, when the software development device is installed in the same PC as the source code equivalence verification device 1000 of the present embodiment, the software developer inputs the non-refactored/refactored source code through the input device 130 of FIG. 3 or the like, stores data thereof in the non-refactored/refactored source code storage region 1603, and executes the equivalence verification process.

When the software developer inputs the non-refactored/refactored source code and requests the equivalence verification process, the software developer attaches and inputs refactoring pattern input information 0003 indicating a type of refactoring which has been executed.

As illustrated in FIG. 4, the source code equivalence verification device 1000 of the present embodiment receives two source codes, that is, a non-refactored source code 0001 and a refactored source code 0002 and the refactoring pattern input information 0003 serving as input information related to the refactoring pattern applied to the non-refactored source code 0001, and verifies source code equivalence of the non-refactored source code 0001 and the refactored source code 0002.

First, the input unit 1100 receives the non-refactored source code 0001 which is input or previously stored in the storage unit 1600 (S101 of FIG. 5). In a refactored source code input step S102, the input unit 1100 receives the refactored source code 0002 (S102). The input unit 1100 further receives an input of the refactoring pattern input information 0003 (S103).

A detailed function and a process of the input unit 1100 will be described below with reference to FIG. 6.

The non-refactored source code 0001 is received by a source code input unit 1101 of the input unit 1100, undergoes the lexical analysis and the syntax analysis of the source code, and is converted into non-refactored source code information 1001 as illustrated in FIG. 6. The refactored source code 0002 is also received by the source code input unit 1101 of the input unit 1100, undergoes the lexical analysis and the syntax analysis of the source code, is converted into refactored source code information 1002, and stored in the storage unit 1600. Further, the refactoring pattern input information 0003 is received by a refactoring pattern input unit 1102 of the input unit 1100, converted into the refactoring pattern information 1003 indicating a refactoring pattern type, and stored in the storage unit 1600.

Then, the non-refactored source code information 1001 is compared with the refactored source code information 1002, and a structural change position of the source code is specified (S1041).

Then, the normalizing unit 1200 normalizes the non-refactored source code information 1001 and the refactored source code information 1002 using the information stored in the storage unit 1600 (S1042).

Here, the normalization indicates converting the source code information of the source code that has undergone the refactoring into source code information corresponding to a source code equivalent to the source code. The normalization is performed to convert the information into a form suitable for a structure comparison step S1043 and a symbolic execution step S1045 which are subsequently performed.

A detailed function and a process of the normalizing unit 1200 will be described below with reference to FIG. 7.

The non-refactored source code information 1001 and the refactored source code information 1002 are input to a change position specifying unit 1201 of the normalizing unit 1200. Meanwhile, change position specifying information 1007b corresponding to the refactoring pattern information 1003 stored in the normalization DB 1601 is read. Then, the change position specifying unit 1201 compares the change position specifying information 1007b with the source code information, specifies the structural change position of the source code with reference to the change position specifying information 1007b corresponding to the refactoring pattern information 1003, and generates change position information 1004 (S1041).

Then, normalization information 1007a indicating a normalization method corresponding to the refactoring pattern input information 1003 is acquired from the normalization DB 1601 of the storage unit 1600 (S1042). The normalization information 1007*a* corresponding to each refactoring pattern is stored in the normalization DB 1601. A source code normalizing unit 1202 of the normalizing unit 1200 normalizes the non-refactored source code information 1001 based on the acquired normalization information 1007*a*, and generates normalized non-refactored source code information 1005. The source code normalizing unit 1202 of the normalizing unit 1200 further normalizes the refactored source code information 1002 based on the normalization information 1007*a*, and generates normalized refactored source code information 1006.

Then, the structure comparison verification processing unit 1300 compares the structure of the normalized non-refactored source code information 1005 with the structure of the normalized refactored source code information 1006, and verifies whether or not the structures are identical to each other (step S1043).

A detailed function and a process of the structure comparison verification processing unit 1300 will be described below with reference to FIG. 8.

The structure comparison verification processing unit 1300 receives the normalized non-refactored source code information 1005 and the normalized refactored source code information 1006, verifies whether or not the structures of the two pieces of normalized source code information are identical, generates information indicating that the structures are identical as a structure comparison result 1008 when the structures are identical, and generates information indicating that the structures are not identical as the structure comparison result 1008 when the structures are not identical (S1043).

Then, the symbolic execution implementation determining unit 1700 determines whether or not the symbolic execution has to be performed (S1047). Here, when the structures are determined to be identical in the structure comparison step S1043, the process proceeds to an equivalence/non-equivalence output step S105, and when the structures are determined to be not identical, the process proceeds to a source code information abstraction step S1044.

A detailed function and a process of the symbolic execution implementation determining unit 1700 will be described below with reference to FIG. 9.

The symbolic execution implementation determining unit 1700 receives the structure comparison result 1008, and when the structure comparison result 1008 indicates that the structures are "identical," the process proceeds to the equivalence/non-equivalence output step S105, and the output unit 1500 outputs a verification result 0004 indicating that the source codes are equivalent.

When the result indicating that the source codes are equivalent is output, the user can determine that the performed refactoring is valid.

The symbolic execution implementation determining unit 1700 receives the structure comparison result 1008, and generates a symbolic execution start instruction 1009 when the structure comparison result 1008 indicates that the structures are "not identical."

Then, source code information abstraction is performed (S1044).

Here, the source code information abstraction indicates contracting the source code information while maintaining a state in which the same result is obtained for the same input when the symbolic execution is performed on each source code information.

Then, the symbolic execution is performed on the abstracted non-refactored source code information and the abstracted refactored source code information (S1045).

Then, the symbolic execution results (the symbolic execution summaries) are logically compared, the original source codes are determined to be equivalent when the same output is obtained for the same input, the original source codes are determined to be not equivalent when the outputs (the symbolic execution summaries) are different (S1046), and an equivalence/non-equivalence result is output.

A process of comparing the symbolic execution summary serving as the symbolic execution result before the refactoring with the symbolic execution summary serving as the symbolic execution result after the refactoring and determining whether or not the symbolic execution summaries are logically equivalent is performed using a technique called an SAT solver, an SMT solver, a decision process, or the like. It is possible to generate a logical expression indicating the symbolic execution summary by obtaining a logical product of a path constraint and a variable state of each of leaf nodes configuring the symbolic execution summary and calculating a logical sum of the logical products. It is possible to determine equivalence between the symbolic execution summaries by determining that the logical expression generated from the symbolic execution summary before the refactoring is equivalent to the logical expression generated from the symbolic execution summary after the refactoring, using the SAT solver.

Here, when the result indicating that the source codes are equivalent is output, the user can determine that the performed refactoring is valid, and when the result indicating that the source codes are not equivalent is output, the user can determine that the performed refactoring is invalid. Then, when the performed refactoring is determined to be invalid, the user can start a work of reviewing the performed refactoring and correcting the refactoring to a valid one.

The symbolic execution verification processing unit 1400 receives the symbolic execution start instruction 1009, and starts a source code abstraction step S1044. In the source code abstraction step S1044, the normalized non-refactored source code information and the change position information 1004 are received, and the abstraction is performed using abstraction information 1010 stored in the abstraction DB 1602 of the storage unit 1600 to generate abstracted non-refactored source code information 1403. Further, in the source code abstraction step S1044, the normalized refactored source code information and the change position information 1004 are received, and the abstraction is performed using the abstraction information 1010 stored in the abstraction DB 1602 of the storage unit 1600 to generate abstracted refactored source code information 1404. Here, the abstraction information 1010 stored in the abstraction DB is information related to a process method of replacing a position unrelated to the change position information 1004 with a loop or a recursive call position for the normalized source code information and converting the position unrelated to the change position information 1004 and the loop or the recursive call position in the subsequent symbolic execution step S1045 so that the symbolic execution is not performed.

In the symbolic execution step S1045, a symbolic execution unit 1402 performs the symbolic execution on the abstracted non-refactored source code information 1403 and the abstracted refactored source code information 1404, and obtains a pre-refactoring symbolic execution result 1405 and a post-refactoring symbolic execution result 1406. In a symbolic execution result comparison step S1046, a symbolic execution result comparing unit 1407 determines whether or not the pre-refactoring symbolic execution result 1405 is identical to the post-refactoring symbolic execution result 1406 by comparing the pre-refactoring symbolic execution result 1405 with the post-refactoring symbolic execution result 1406. When the symbolic execution result comparing unit 1407 determines the pre-refactoring symbolic execution result 1405 to be identical to the post-refactoring symbolic execution result 1406, the process proceeds to the equivalence/non-equivalence output step S105, and the verification result 0004 indicating the equivalence is output to the output unit 1500. When the symbolic execution result comparing unit. 1407 determines the pre-refactoring symbolic execution result 1405 to be different from the post-refactoring symbolic execution result 1406, the process proceeds to the equivalence/non-equivalence output step S105, and the verification result 0004 indicating the non-equivalence is output to the output unit 1500.

According to the source code equivalence verification device of the present embodiment, before the symbolic execution in which the complexity is likely to explode is performed, the normalization and the structure comparison are sequentially performed on the non-refactored source code information and the refactored source code information, and when the original source codes are determined to be equivalent, the symbolic execution is not performed.

Further, when the original source codes are determined to be not equivalent by the structure comparison, the source code information abstraction is performed to reduce the source code information, and then the symbolic execution is performed, and thus the complexity of the symbolic execution can be reduced.

Second Embodiment

A specific example of a process of the source code equivalence verification device according to an embodiment of the present invention will be described below with reference to FIG. 5 and FIGS. 11 to 14. This example is an example in which the structures of the structure graphs serving as the source code information are determined to be identical in the process of symbolic execution implementation determination S1047 of FIG. 5.

FIG. 11 is a (first) diagram illustrating examples of a non-refactored source code and a refactored source code.

Figure 12:
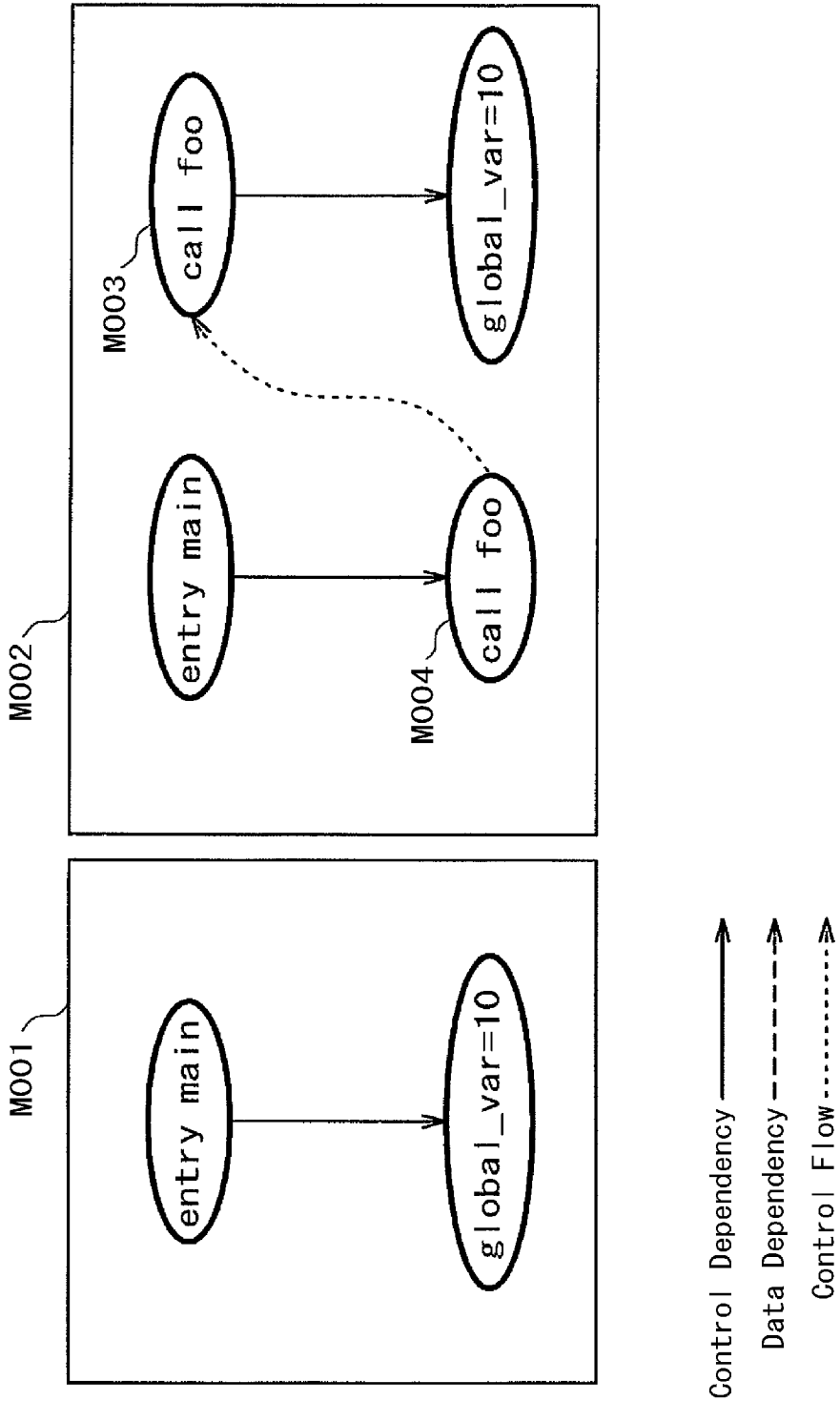
FIG. 12 is a (first) diagram illustrating an example of source code information of a non-refactored source code and a refactored source code.

FIG. 12 is a (first) diagram illustrating an example of source code information of a non-refactored source code and a refactored source code.

Figure 13:
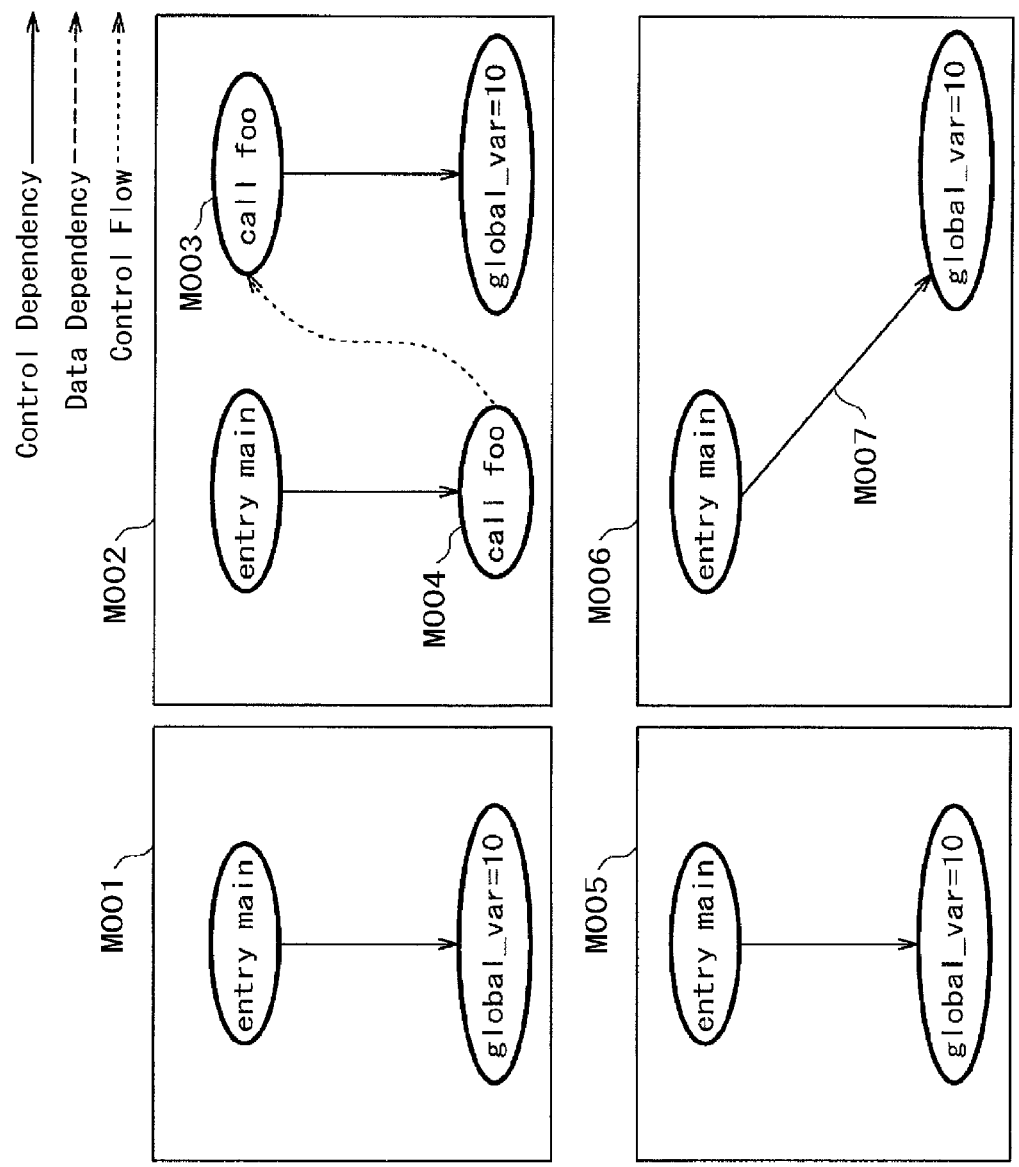
FIG. 13 is a diagram illustrating an example of normalization performed on source code information.

FIG. 13 is a diagram illustrating an example of normalization performed on the source code information.

Figure 14:
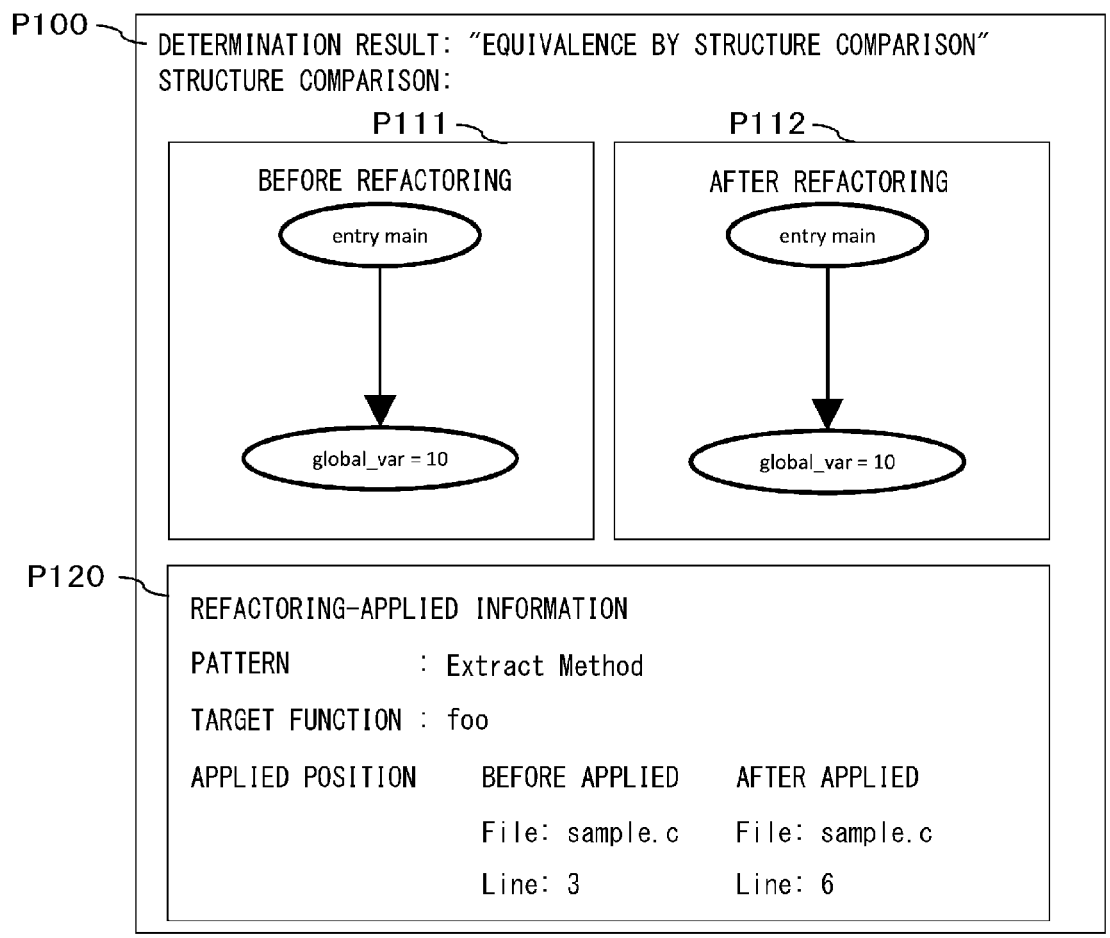
FIG. 14 is a diagram illustrating a display example of an output unit that displays a result of performing equivalence verification on a normalized structure graph by a structure comparison.

FIG. 14 is a diagram illustrating a display example of an output unit that displays a result of performing equivalence verification on the normalized structure graph by a structure comparison.

The description will proceed with an example in which refactoring based on a refactoring pattern ExtractMethod is performed as refactoring for the source code. The refactoring pattern ExtractMethod is a pattern of refactoring of extracting the same process as a function in source codes performing the same process at a plurality of positions and commonalizing the source codes existing at the plurality of positions by replacing the plurality of positions at which the same process is performed with a call of the extracted function. The refactoring pattern ExtractMethod is also used as refactoring of, when a description amount of source codes is large in one function, extracting some source codes in the function as a separate function in order to improve readability of the function.

An example of performing source code refactoring through the refactoring pattern ExtractMethod will be described below with reference to FIG. 11.

The source code C001 is a source code to which the refactoring pattern ExtractMethod is not applied yet and a program in which 10 is assigned to a global variable global_var in a main function. A source code obtained by applying the refactoring pattern ExtractMethod to the source code C001 is C002. In the source code C002, an assignment statement to the global variable global_var=10 in the source code C001 is extracted as the function foo, and a position at which a description portion of global_var=10 exists is converted into a call of the function foo.

First, the steps of the non-refactored source code input S101, the refactored source code input S102, and inputting information related to the refactoring pattern S103 of FIG. 5 in the refactoring example illustrated in FIG. 11 will be described.

In the input unit 1100, the source code input unit 1101 receives the non-refactored source code 0001 and the refactored source code 0002, and generates the corresponding non-refactored source code information 1001 and the refactored source code information. Here, the non-refactored source code 0001 corresponds to the source code C001, and the refactored source code 0002 corresponds to the source code C002.

The source code equivalence verification device 1000 performs the lexical analysis and the syntax analysis on the input non-refactored source code 0001 and the refactored source code 0002 through the source code input unit 1101, and converts the input non-refactored source code 0001 and the refactored source code 0002 into the structure graphs which are internally dealt with and illustrated in FIG. 12. In the example of the refactoring pattern ExtractMethod, the source code C001 is converted into a structure graph M001, and the source code C002 is converted into the structure graph M002. Here, the non-refactored source code information 1001 corresponds to the structure graph M001, and the refactored source code information 1002 corresponds to the structure graph M002.

In the input unit 1100, the refactoring pattern input unit 1102 receives the refactoring pattern input information 0003, and generates the refactoring pattern information 1003. In this example, for example, when the refactoring pattern input information 0003 is a character string "ExtractMethod" or a selection number of a menu of a screen indicating the refactoring pattern ExtractMethod, a code indicating the refactoring pattern ExtractMethod is internally generated as the refactoring pattern information 1003.

Next, the change position specifying step S1041 of FIG. 5 will be described.

The change position specifying unit 1201 of the normalizing unit 1200 specifies a change position on the source code from the structure graph using the corresponding change position specifying information 1007*b* stored in the normalization DB 1601 with reference to the non-refactored source code information 1001, the refactored source code information 1002, and the refactoring pattern information 1003, and outputs the change position information 1004. In the example of the refactoring pattern ExtractMethod, the refactoring pattern ExtractMethod compares function declarations of the non-refactored source code information 1001 and the refactored source code information 1002 in view of a feature in which the function (entry foo) in the refactored source code information 1002 increases, and specifies a function appearing only in the refactored source code information 1002 as the change position. In FIG. 12, an entry indicating the function in the structure graph M001 of the non-refactored source code information 1001 is compared with an entry indicating the function in the structure graph M002 of the refactored source code information 1002, and since the function foo of the entry indicated by a node M003 increases, the node M003 and a node M004 calling the function foo correspond to the change position information 1004.

Next, the source code information normalization step S1042 of FIG. 5 will be described. The source code normalizing unit 1202 of the normalizing unit 1200 performs the normalization based on the change position information 1004 and the non-refactored source code information 1001 using the corresponding normalization information 1007a stored in the normalization DB 1601, and generates the normalized non-refactored source code information 1005. The refactored source code information 1002 similarly performs the normalization, and generates the normalized refactored source code information 1006 as well. FIG. 13 illustrates an example of the source code normalizing unit 1202 in the refactoring pattern ExtractMethod. First, the normalization information 1007a corresponding to the refactoring pattern ExtractMethod serving as the refactoring pattern information 1003 is acquired from the normalization DB 1601. According to the normalization information 1007a corresponding to ExtractMethod of the refactoring pattern information 1003, the normalization method causes the extracted function of the change position information 1004 in the refactored source code information 1002 to have a structure indicating the source code restored to the original state by in-line expansion.

In FIG. 13, the change position information 1004 is the node M003 and the node M004 in the structure graph M002 of the refactored source code information 1002, and the nodes are the extracted functions foo created by the refactoring, and thus when the function foo is restored to the original state by the normalization, a structure graph M006 is obtained. The structure graph M006 corresponds to the normalized refactored source code information 1006. Since the normalized non-refactored source code information 1005 does not undergo the normalization process in connection with the refactoring pattern ExtractMethod, the structure graph M001 of the non-refactored source code information 1001 of FIG. 13 does not change in the normalization and becomes a structure graph M005 without change.

The structure comparison step S1043 of FIG. 5 will be described.

The structure comparison verification processing unit 1300 receives the normalized non-refactored source code information 1005 and the normalized refactored source code information 1006, compares the structures of the source code information, and generates a result thereof as the structure comparison result 1008. In the example of FIG. 13 in which the refactoring based on the refactoring pattern ExtractMethod is performed, the structure comparison verification processing unit 1300 determines that the source code C001 and the source code C002 are equivalent as the structure comparison result 1008 since the two graphs, that is, the graph M005 of the normalized non-refactored source code information 1005 and the graph M006 of the normalized refactored source code information 1006, have the same structure, and the nodes are identical.

Next, the symbolic execution implementation determination step S1047 of FIG. 5 will be described.

In the example of FIG. 11 in which the refactoring based on the refactoring pattern ExtractMethod is performed, since the symbolic execution implementation determining unit 1700 determines that the non-refactored source code and the refactored source code are equivalent as the structure comparison result 1008, the process proceeds to the equivalence/non-equivalence output step S105, and the output unit 1500 receives the determination result of the structure comparison verification processing unit 1300 indicating the equivalence, and outputs information indicating the equivalence as the verification result 0004.

In the example of FIG. 11 in which the refactoring based on the refactoring pattern ExtractMethod is performed, since the symbolic execution implementation determining unit 1700 determines that the non-refactored source code and the refactored source code are equivalent through the conversion process of the normalizing unit 1200 and the determination process of the structure comparison verification processing unit 1300, the symbolic execution verification processing unit 1400 need not calculate the symbolic execution, and thus the complexity is not unnecessarily increased, and the rapid equivalence determination can be performed.

FIG. 14 illustrates a display example of the verification result 0004 by the output unit 1500 when the equivalence is determined by the determination process of the structure comparison verification processing unit 1300. In the display example illustrated in FIG. 14, the determination is performed by the structure comparison, and as a result, a determination result P100 indicating the equivalence is obtained. A structure graph P111 of the normalized non-refactored source code information that has undergone the normalization and a structure graph P112 of the normalized refactored source code information are displayed as structure graph data used for the structure comparison. ExtractMethod serving as an applied refactoring pattern name, foo serving as a function name extracted by ExtractMethod, and a file name sample.c and a line number 3 for a non-refactored source code and a file name sample.c and a line number 6 for a refactored source code which are information of a position to which the refactoring pattern is applied are displayed as refactoring-applied information P120.

By viewing the refactoring-applied information P120 illustrated in FIG. 14, it can be confirmed that the pattern and the position of the refactoring recognized by the equivalence verification device are identical to those of the refactoring intended by the developer.

Third Embodiment

A specific example of a process of the source code equivalence verification device according to an embodiment of the present invention will be described below with reference to FIG. 5 and FIGS. 15 to 20. This example is an example in which the structures of the structure graphs serving as the source code information are determined to be not identical in the source code that has undergone the refactoring not dependent on the registered refactoring pattern in the process of the symbolic execution implementation determination of FIG. 5.

FIG. 15 is a (second) diagram illustrating examples of the non-refactored source code and the refactored source code.

FIG. 16 is a (second) diagram illustrating an example of the source code information of the non-refactored source code and the refactored source code.

FIG. 17 is a diagram illustrating an example of the abstracted source code information.

FIG. 18 illustrates an example of an execution tree when symbolic execution is performed on the non-refactored source code and the refactored source code.

Figure 19:
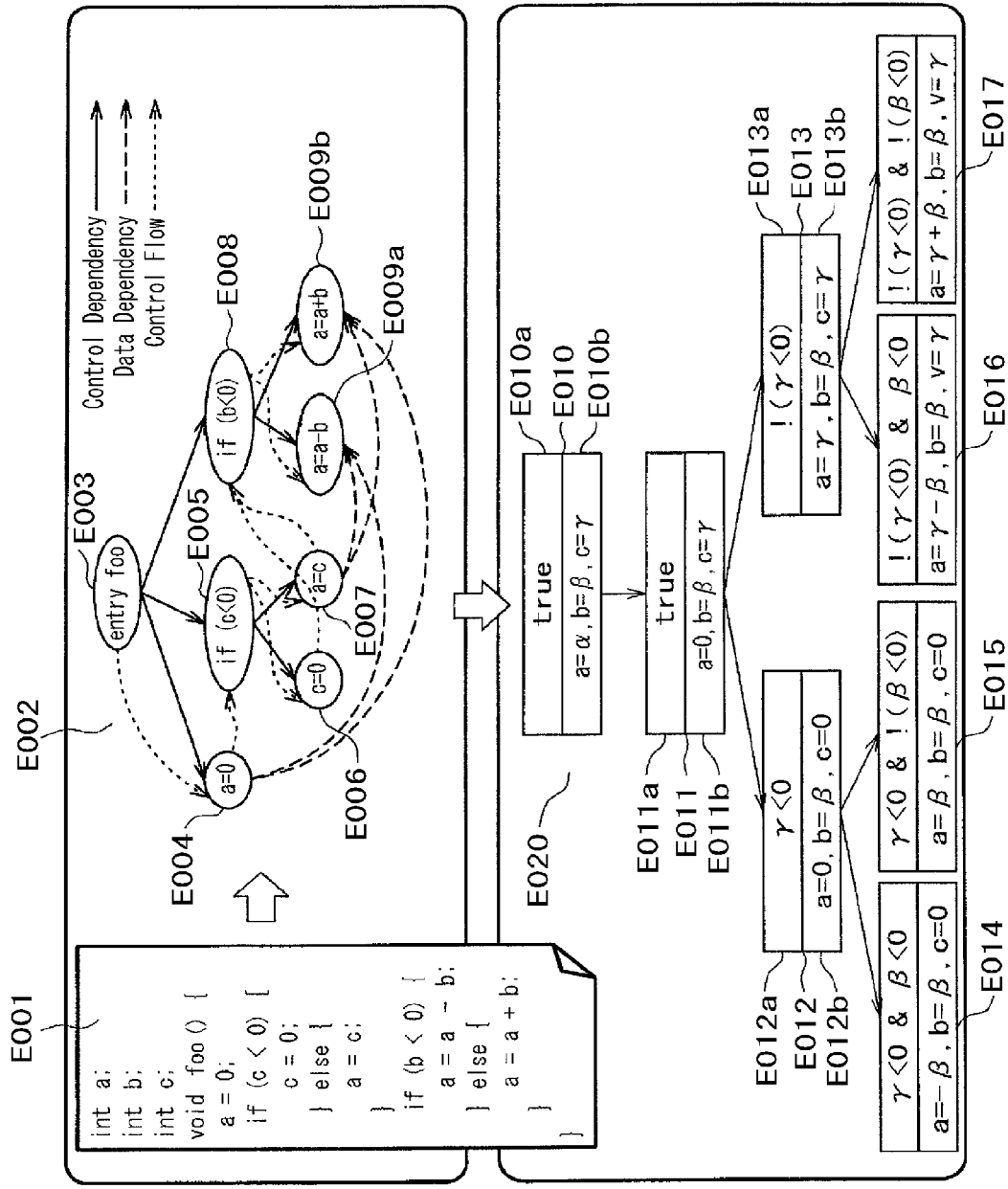
FIG. 19 is a diagram illustrating a source code and a data structure derived therefrom to describe an example of symbolic execution.

FIG. 19 is a diagram illustrating a source code and a data structure derived therefrom to describe an exemplary symbolic execution.

Figure 20:
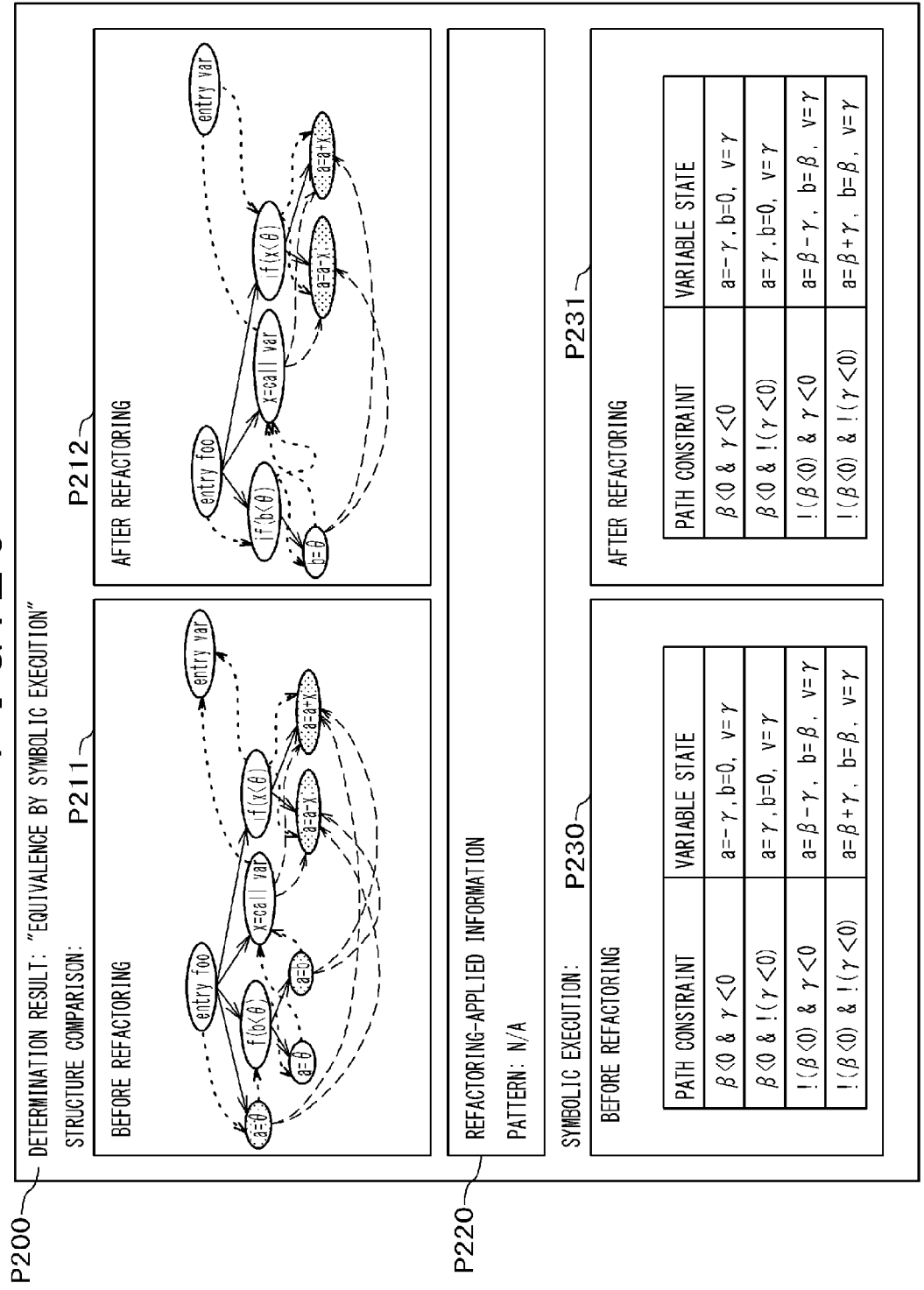
FIG. 20 is a diagram illustrating a display example of a display unit that displays a result of performing equivalence verification through a symbolic execution verification processing unit.

FIG. 20 is a diagram illustrating a display example of a display unit that displays a result of performing the equivalence verification through the symbolic execution verification processing unit.

The description will proceed with an example in which refactoring of adjusting an assignment to a variable without changing a conditional expression in a source code is performed as refactoring for a source code.

In FIG. 15, a non-refactored source code C003 and a refactored source code C004 are illustrated, refactoring of adjusting an assignment to a variable without changing a conditional expression in a source code is applied between the source code C003 and the source code C004. Specifically, in the non-refactored source code C003, a value is assigned to the variable a in a portion indicated by a source code portion C005, and in a portion indicated by the source code portion C006, a value calculated using a value of the variable a (the right side) is assigned to the variable a (the left side). In the refactored source code C004, a value is assigned to the variable b in a portion indicated by a source code portion C007, and in a portion indicated by the source code portion C008, a value calculated using a value of the variable b is assigned to the variable a. Before and after the refactoring, the conditional expressions present in the portion indicated by the source code portion C005 and the portion indicated by the source code portion C007 are identical to the conditional expressions present in the portion indicated by the source code portion C006 and the portion indicated by the source code portion C008, but since the used variable is changed, and the number of lines of the source code is smaller, the source code C004 is higher in readability. The example of the refactoring illustrated in FIG. 15 does not correspond to 72 types of refactoring patterns described in Non Patent Literature 4 and is assumed to have not been registered in the database in the source code equivalence verification device 1000 of the present embodiment as a pattern.

First, in the example of the refactoring illustrated in FIG. 15, the non-refactored source code input S101 and the refactored source code input S102 of FIG. 5 will be described. In the example of the refactoring, the non-refactored source code 0001 corresponds to the source code C003, and the refactored source code 0002 corresponds to the source code C004. In the input unit 1100, the source code input unit 1101 receives the non-refactored source code 0001 and the refactored source code 0002, and generates the corresponding non-refactored source code information 1001 and the refactored source code information 1002. In the example of the refactoring of FIG. 15, the source code input unit 1101 receives the source code C003 as the non-refactored source code 0001, performs the lexical analysis and the syntax analysis, and converts the source code C003 into a structure graph M008 of FIG. 16 as the non-refactored source code information 1001. Further, the source code input unit 1101 receives the source code C004 as the refactored source code 0002, performs the lexical analysis and the syntax analysis, and converts the source code C004 into a structure graph M009 of FIG. 16 as the refactored source code information 1002. Here, the non-refactored source code information 1001 corresponds to the structure graph M008, and the refactored source code information 1002 corresponds to the structure graph M009.

Next, the step S103 of inputting information related to the refactoring pattern will be described.

In the input unit 1100, the refactoring pattern input unit 1102 receives the refactoring pattern input information 0003, and generates the refactoring pattern information 1003. In the example of the refactoring, since the refactoring pattern is assumed to have not been registered, a character string or a selection number of a menu indicating "not applicable (N/A)" is input the refactoring pattern input unit 1102, and the refactoring pattern input unit generates a code indicating "not applicable (N/A)" as the refactoring pattern information 1003.

Next, the change position specifying step S1041 of FIG. 5 will be described.

The change position specifying unit 1201 of the normalizing unit 1200 specifies the change position on the source code based on the non-refactored source code information 1001 and the refactored source code information 1002, and outputs the change position information 1004. In the example of the refactoring, when the structure graph M008 corresponding to the non-refactored source code information 1001 is compared with the structure graph M009 corresponding to the refactored source code information 0002, since the function foo and the function var are included in both graphs, there is no increase in the function level, and since a difference is shown in the function foo, the change position specifying unit 1201 outputs the inside of the function foo as the change position information 1004. In this example, since the refactoring pattern indicates "not applicable (N/A)," the change position is specified by analyzing the structures of the structure graphs without reference to the change position specifying information 1007b of the normalization DB 1601.

Next, the source code information normalization step S1042 of FIG. 5 will be described.

The source code normalizing unit 1202 of the normalizing unit 1200 performs the normalization with reference to the change position information 1004 and the non-refactored source code information 1001 using the normalization technique of the corresponding normalization information 1007a stored in the normalization DB 1601, and generates the normalized non-refactored source code information 1005. The refactored source code information 1002 similarly performs the normalization, and generates the normalized refactored source code information 1006. In the example of the refactoring, the normalization information in which the refactoring pattern information 1003 corresponds to "not applicable (N/A)" is acquired from the normalization DB 1601. Here, since the normalization information in which the refactoring pattern information 1003 corresponds to "not applicable (N/A)" is not converted, the source code normalizing unit 1202 outputs the normalized non-refactored source code information 1005 and the normalized refactored source code information 1006 without changing the non-refactored source code information 1001 and the refactored source code information 1002 at all. Since no conversion is performed by the normalizing unit 1200, the normalized non-refactored source code information 1005 is the structure graph M008 of FIG. 16, and the normalized refactored source code information 1006 is the structure graph M009 of FIG. 16.

Next, the structure comparison step S1043 of FIG. 5 will be described.

The structure comparison verification processing unit 1300 receives the normalized non-refactored source code information 1005 and the normalized refactored source code information 1006, compares the structures of the source code information, and generates the structure comparison result 1008.

A variety of methods of searching equivalence or non-equivalence of a plurality of graph structures are considered, but, for example, a method of comparing nodes of all layers in a descending order of layers such that nodes of the highest layer are first compared, child nodes thereof are compared, and then child nodes thereof are compared and determining that both graph structures are different when any two of them are not identical is known.

In the example of the refactoring, the graph M008 of the normalized non-refactored source code information 1005 is compared with the structure graph M009 of the normalized refactored source code information 1006, and the graph structures are determined to be explicitly different since there is no child node "a=0" of the node "entry foo" in the graph M009, and the structure comparison result 1008 determining the non-refactored source code and the refactored source code to be non-equivalent.

Next, the symbolic execution implementation determination step S1047 of FIG. 5 will be described.

In the example of the refactoring, since the structure comparison result 1008 indicates that the source codes are determined to be non-equivalent, the symbolic execution implementation determining unit 1700 generates a command of the symbolic execution start instruction 1009.

Next, the source code information abstraction step S1044 of FIG. 5 will be described.

In the symbolic execution verification processing unit 1400, when the symbolic execution start instruction 1009 is received, the abstracting unit 1401 abstracts the normalized non-refactored source code information 1005 and the normalized refactored source code information 1006 using the change position information 1004 and the abstraction information 1010 in which an abstraction method of the abstraction DB 1602 is recorded. An appropriate abstraction technique is recorded in the abstraction information 1010 of the abstraction DB 1602 in association with the change position information 1004. In the example of the refactoring, since the change position information 1004 is identified as the inside of the function foo, the abstraction information 1010 in which a method of performing abstraction by converting a function that does not change before and after the refactoring in the source code excluding the function foo into a variable is described is acquired from the abstraction DB 1602. FIG. 17 illustrates a result of applying the method of performing abstraction by converting the function that does not change before and after the refactoring to the graph M008 of the normalized non-refactored source code information 1005 and the graph M009 of the normalized refactored source code information 1006 through the abstracting unit 1401. In the structure graph M008 of the normalized non-refactored source code information 1005 of FIG. 16, since there is no difference in a function var of a node M010, the abstraction is performed such that the node M010 is combined with a node M011 at a position of calling the function var as the variable v, and thus the structure graph M008 is converted into a structure graph M014 of FIG. 17. Here, the abstraction having no data dependency between the node M010 and another node is necessary. Similarly, the abstraction is performed on the graph M009 of the normalized refactored source code information 1006 of FIG. 16, and thus the graph M009 is converted into a structure graph M015. The abstracting unit 1401 outputs the structure graph M014 as the abstracted non-refactored source code information 1403, and outputs the structure graph M015 as the abstracted refactored source code information 1404. Here, it is noted that when the node is cut, and the symbolic execution is executed on each of the structure graphs M008 and M009, the complexity is reduced by the abstraction.

Next, the symbolic execution step S1045 of FIG. 5 will be described.

In the symbolic execution verification processing unit 1400, after the abstraction is performed by the abstracting unit 1401, the symbolic execution unit 1402 executes the symbolic execution on each of the abstracted non-refactored source code information 1403 and the abstracted refactored source code information 1404, and the pre-refactoring symbolic execution result 1405 and the post-refactoring symbolic execution result 1406 are consequently generated. FIG. 18 illustrates a result of executing the symbolic execution on the abstracted non-refactored source code information 1403 and the abstracted refactored source code information 1404 through the symbolic execution unit 1402 in the example of the refactoring. In the example of the refactoring, the abstracted non-refactored source code information 1403 corresponds to the structure graph M014 of FIG. 17, and when the symbolic execution is executed on the structure graph M014, an execution tree E100 of FIG. 18 is obtained. Further, in the execution tree E100 of FIG. 18, the symbolic execution summaries E101, E102, E103, and E104 are the pre-refactoring symbolic execution result 1405 for the abstracted non-refactored source code information 1403. The abstracted refactored source code information 1404 corresponds to the structure graph M015 of FIG. 17, and when the symbolic execution is executed on the structure graph M015, an execution tree E200 of FIG. 18 is obtained. Further, in the execution tree E200 of FIG. 18, the symbolic execution summaries E201, E202, E203, and E204 are the post-refactoring symbolic execution result 1406 for the abstracted refactored source code information 1404.

Next, the symbolic execution result comparison step S1046 of FIG. 5 will be described.

The symbolic execution result comparing unit 1407 of the symbolic execution verification processing unit 1400 compares the pre-refactoring symbolic execution result 1405 with the post-refactoring symbolic execution result 1406 in terms of logical equivalence, and determines whether the non-refactored source code and the refactored source code are equivalent or non-equivalent. In the example of the refactoring of FIG. 15, the pre-refactoring symbolic execution result 1405 is E101, E102, E103, and E104, the post-refactoring symbolic execution result 1406 is E201, E202, E203, and E204. It is determined whether or not the two symbolic execution results are logically equivalent as follows.

A logical sum of four logical expressions, that is, a logical product of a path constraint and a variable state of E101, a logical product of a path constraint and a variable state of E102, a logical product of a path constraint and a variable state of E103, and a logical product of a path constraint and a variable state of E104 is obtained as a logical expression indicating the symbolic execution summary before the refactoring. In other words, $((\beta<0)$ AND $(\gamma<0)$ AND $(a=-\gamma)$ AND $(b=0)$ AND $(v=\gamma))$ OR $((\beta<0)$ AND $(\text{NOT }(\gamma<0))$ AND $(a=\gamma)$ AND $(b=0)$ AND $(v=\gamma))$ OR $((\text{NOT }(\beta<0))$ AND $(\gamma<0)$ AND $(a=\beta-\gamma)$ AND $(b=\beta)$ AND $(v=\gamma))$ OR $((\text{NOT }(\beta<0))$ AND $(\text{NOT }(\gamma<0))$ AND $(a=\beta+\gamma)$ AND $(b=\beta)$ AND $(v=\gamma))$ is the logical expression indicating the symbolic execution summary before the refactoring. A logical sum of four logical expressions, that is, a logical product of a path constraint and a variable state of E201, a logical product of a path constraint and a variable state of E202, a logical product of a path constraint and a variable state of E203, and a logical product of a path constraint and a variable state of E204 is obtained as a logical expression indicating the symbolic execution summary after the refactoring. For the sake of convenience, if values of the output variables a, b, and after the refactoring are indicated by a', b', and v', the logical expression indicating the symbolic execution summary after the refactoring is ((($\beta$<0) AND ($\gamma$<0) AND (a'=−$\gamma$) AND (b'=0) AND (v'=$\gamma$)) OR (($\beta$<0) AND (NOT ($\gamma$<0)) AND (a'=$\gamma$) AND (b'=0) AND (v'=$\gamma$)) OR ((NOT (p<0)) AND ($\gamma$<0) AND (a'=$\beta$−$\gamma$) AND (b'=$\beta$) AND (v'=$\gamma$)) OR ((NOT (($\beta$<0)) AND (NOT ($\gamma$<0)) AND (a'=$\beta$+$\gamma$) AND (b'=$\beta$) AND (v'=$\gamma$)).

It is determined whether or not the logical expression indicating the symbolic execution summary before the refactoring is logically equivalent to the logical expression indicating the symbolic execution summary after the refactoring.

In this determination method, it is desirable to verify that the values of the output variables are identical when the values of the symbolic variables included in the logical expression indicating the symbolic execution summary before the refactoring are identical to the values of the symbolic variables included in the logical expression indicating the symbolic execution summary after the refactoring. This is implemented by solving a satisfiability problem for a formula of a logical product of the logical expression indicating the symbolic execution summary before the refactoring, the logical expression indicating the symbolic execution summary after the refactoring, and the logical expression NOT ((a=a') AND (b=b') AND (v=v')) through the SAT solver. If a result solved by the SAT solver is satisfiability, since it is understood that when the same input value is given, there is no case in which different output values are obtained before and after the refactoring, the logical expressions are determined to be logically equivalent. If a result solved by the SAT solver is non-satisfiability, it indicates that there are cases in which different values are obtained before and after the refactoring for the same input value. At this time, it is possible to obtain examples (counter examples) of input values that are non-equivalent using examples of satisfiable values output by the SAT solver. A program which is commonly provided is used as the SAT solver used herein.

In this example, a result indicating that both the logical expressions are equivalent can be obtained. This result is also understood from the fact that each of a pair of E101 and E201, a pair of E102 and E202, a pair of E103 and E203, and a pair of E104 and E204 is identical in the path constraint and the variable state.

The symbolic execution result comparing unit 1407 transfers the determination indicating the equivalence obtained by the SAT solver to the output unit 1500. At this time, there is a structural difference between the pre-refactoring symbolic execution tree E100 and the post-refactoring symbolic execution tree E200, but since the final symbolic execution summaries of the symbolic execution are logically identical, the source codes are determined to be equivalent.

Next, the equivalence/non-equivalence output step S105 of FIG. 5 will be described.

The output unit 1500 receives the result of determining that the source codes are equivalent through the symbolic execution result comparing unit 1407, and outputs the verification result 0004 indicating that the source codes are equivalent. FIG. 20 illustrates an example of the verification result 0004 output by the output unit 1500.

In a display example illustrated in FIG. 20, the determination is performed by the symbolic execution, and as a result, a determination result P200 indicating the equivalence is obtained. A structure graph P211 of the normalized non-refactored source code information that has undergone the normalization and a structure graph P212 of the normalized refactored source code information are displayed as structure graph data used for the structure comparison. Further, an applied normalized refactoring pattern indicating "not applicable (N/A)" is displayed as refactoring-applied information P220. In the structure graphs P211 and P212, nodes determined to be different as a result of structure comparison are displayed in a different color, and thus a portion of the source code which is determined to be not equivalent as a result of structure comparison is understood. Further, the structure graphs are comparatively displayed, and thus how the abstraction has been performed is understood.

In the display example illustrated in FIG. 20, a symbolic execution summary information P230 for the non-refactored source code and a symbolic execution summary information P231 for the refactored source code are displayed as information specific to the determination by the symbolic execution. In the symbolic execution summary information P230 and P231, the path constraints and the variable states in E101, E102, E103, E104, and E201, E202, E203, and E204 are displayed line by line. Thus, the developer can understand the symbolic execution result and understand the logical expression that is used for the equivalence determination. Further, the user can determine that the refactoring is valid.

The display example illustrated in FIG. 20 is a display example when the equivalence determination is performed by the symbolic execution. When the non-equivalence is determined by the symbolic execution, counter example information is also displayed in addition to the information illustrated in FIG. 20. The counter example information is an example of an input indicating that the symbolic execution summary before the refactoring is not equivalent the symbolic execution summary after the refactoring, which is obtained by the SAT solver. As the counter example information is displayed, the developer can understand an input for which the non-refactored source code and the refactored source code have different outputs. Thus, it is possible to analyze the ground for inappropriate refactoring.

In this example, since the structural difference on the structure graph serving as the source code information is recognized by the determination of the symbolic execution implementation determination S1047, the symbolic execution is performed to verify that the source codes are equivalent. Since the source code information abstraction is performed, and the source code information is reduced, it is possible to reduce the complexity of the symbolic execution in the symbolic execution process.

Fourth Embodiment

A specific example of a process of the source code equivalence verification device according to an embodiment of the present invention will be described below with reference to FIG. 5 and FIGS. 21 to 27. This example is an example in which in the process of the symbolic execution implementation determination S1047 of FIG. 5, the structures of the structure graphs serving as the source code information are determined to be not identical in the source code that has undergone the refactoring corresponding to the registered refactoring pattern.

FIG. 21 is a (third) diagram illustrating examples of the non-refactored source code and the refactored source code.

Figure 22:
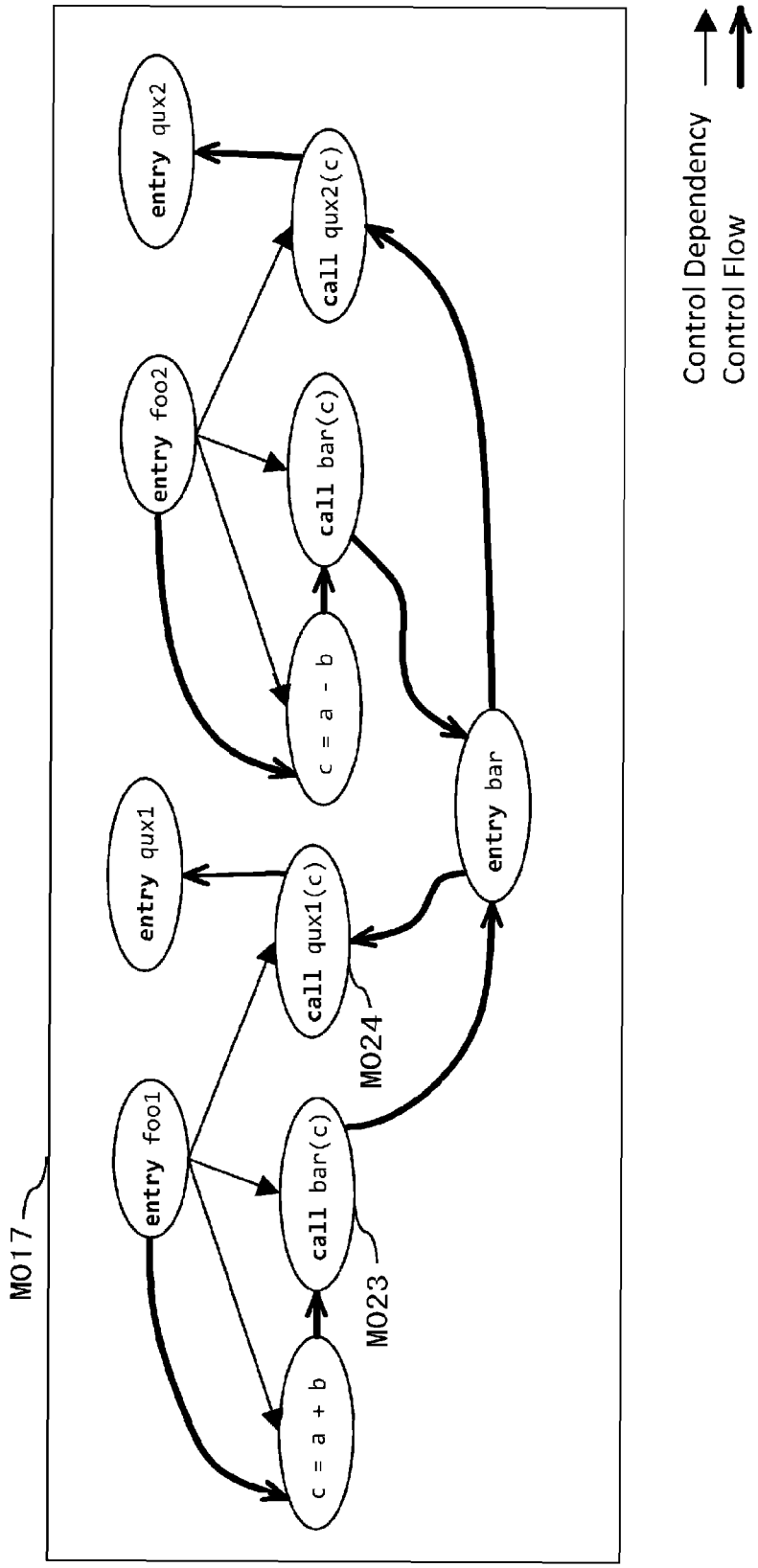
FIG. 22 is a (third) diagram illustrating an example of source code information corresponding to a non-refactored source code.

FIG. 22 is a (third) diagram illustrating an example of the source code information corresponding to the non-refactored source code.

Figure 23:
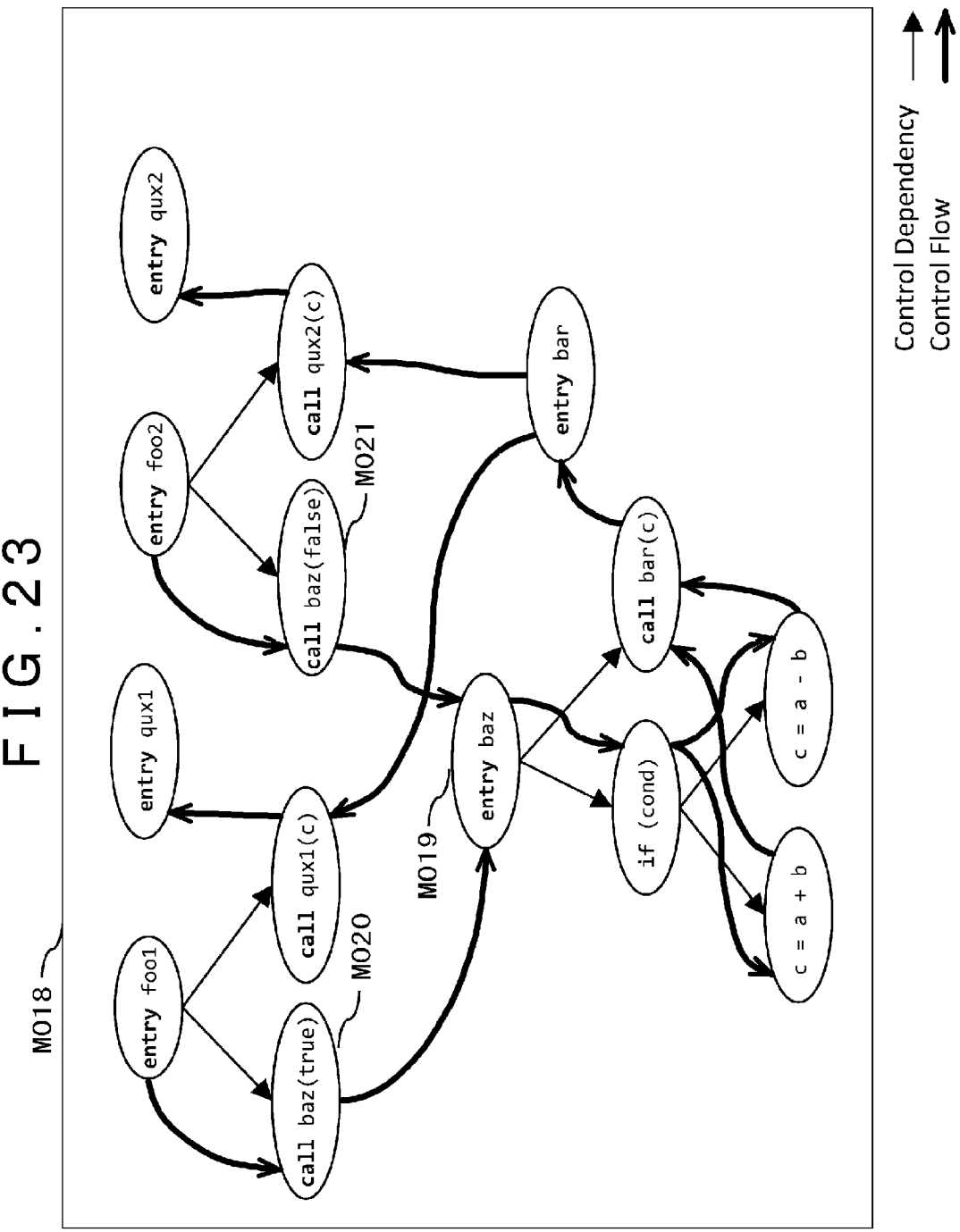
FIG. 23 is a (third) diagram illustrating an example of source code information corresponding to a refactored source code.

FIG. 23 is a (third) diagram illustrating an example of the source code information corresponding to the refactored source code.

Figure 24:
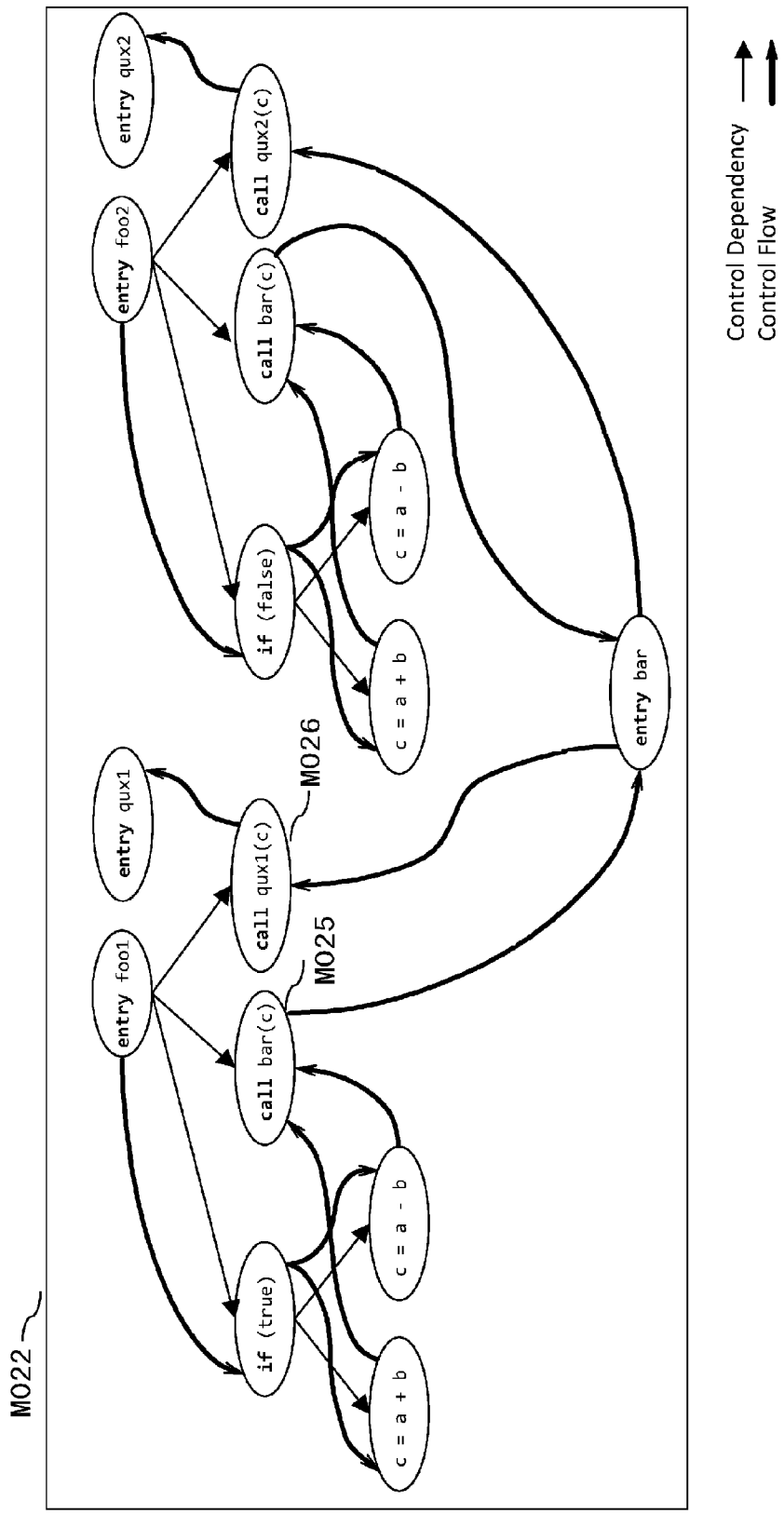
FIG. 24 is a diagram illustrating an, example of normalized refactored source code information.

FIG. 24 is a diagram illustrating an example of the normalized refactored source code information.

Figure 25:
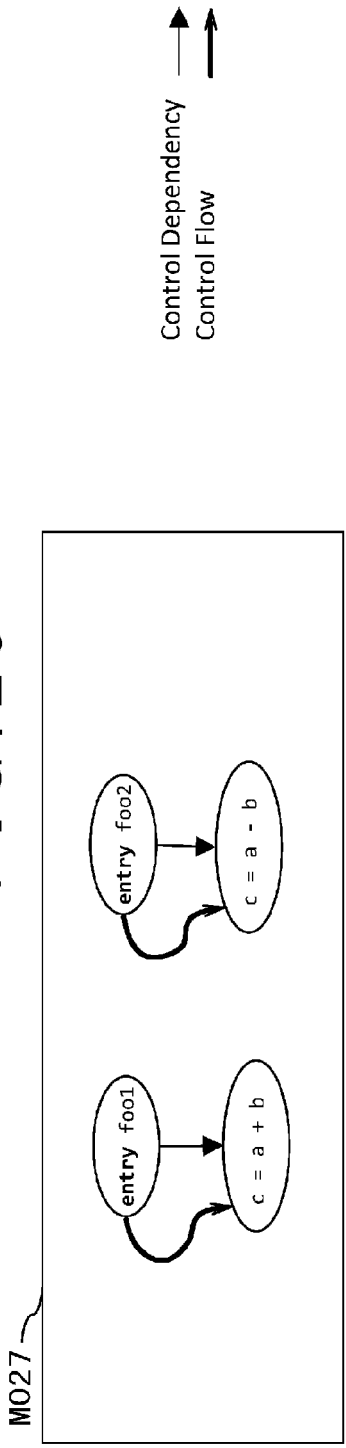
FIG. 25 is a diagram illustrating an example of abstracted source code information.

FIG. 25 is a diagram illustrating an example of the abstracted source code information.

FIG. 26 illustrates an example of an execution tree when abstraction is performed, and symbolic execution is performed on the non-refactored source code and the refactored source code.

Figure 27:
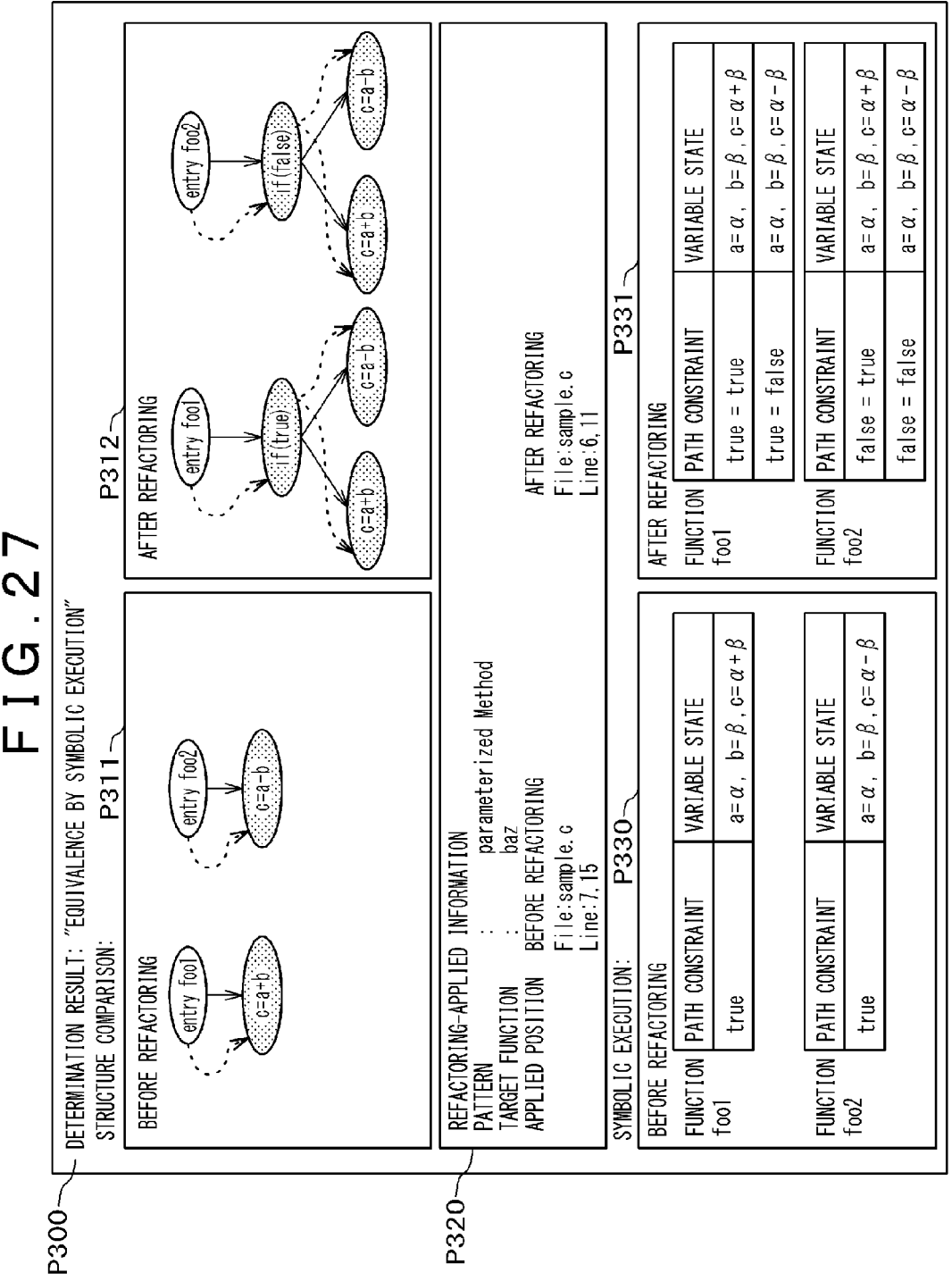
FIG. 27 is a diagram illustrating a display example of an equivalence verification result by a display unit when abstraction is performed.

FIG. 27 is a diagram illustrating a display example of an equivalence verification result by a display unit when abstraction is performed.

The description will proceed with an example in which refactoring based on a refactoring pattern ParameterizedMethod is performed as refactoring for the source code. The refactoring pattern ParameterizedMethod is a pattern of refactoring of extracting a similar process as a function in source codes performing the similar process at a plurality of positions and commonalizing the similar source codes existing at the plurality of positions by replacing the plurality of positions at which the similar process is performed with a call of the extracted function.

ParameterizedMethod differs from ExtractMethod in that ExtractMethod is assumed to extract the same process, but ParameterizedMethod is assumed to extract the processes that are similar but not the same. In ParameterizedMethod, when the processes that are similar but not the same are extracted, in an extracted function, a parameter indicating a type of a difference of a process is received, and a difference is made in a conditional branch for the parameter. At an extracted position, the difference of the process is absorbed by attaching a parameter indicating a difference to the extracted function and calling the extracted function.

FIG. 21 illustrates a non-refactored source code C009 and a refactored source code C010. The source code C009 is a source code to which the refactoring pattern ParameterizedMethod has not been applied, a function foo1 is configured with a portion of C011 in which an addition of a global variable a and a global variable b is assigned to a global variable c, and a function bar is called using the global variable c as parameter and a portion of C012 in which a function qux1 is called using the global variable c as a parameter, and a function foot is configured with a portion of C013 in which a subtraction of the global variable b from the global variable a is assigned to the global variable c, and the function bar is called using the global variable c as parameter and a portion of C014 in which a function qux2 is called using the global variable c as a parameter. The source code C010 is a source code to which the refactoring pattern ParametrizedMethod has been applied, a position of C011 serving as a part of the process in the function foo 1 in the source code C009 and a position of C013 serving as a part of the process in the similar function foo 2 are extracted as a function baz, and C015 and C017 serving as positions corresponding to the extracted positions are replaced with a call of the function baz. In the extracted function baz, in a process portion indicated by C019, the addition process and the subtraction process of the global variable a and the global variable b which are the difference between C011 of the function foo 1 and 0013 of the function foo 2 are sorted by a conditional branch for a parameter having a Boolean value.

The non-refactored source code input S101 and the refactored source code input S102 of FIG. 5 in the example of the refactoring illustrated in FIG. 21 will be described. In the example of the refactoring, the non-refactored source code 0001 corresponds to the source code C009, and the refactored source code 0002 corresponds to the source code C010. In the input unit 1100, the source code input unit 1101 receives the non-refactored source code 0001 and the refactored source code 0002, and generates the corresponding non-refactored source code information 1001 and the refactored source code information 1002.

In the example of the refactoring of FIG. 21, the source code input unit 1101 receives the source code C009 as the non-refactored source code 0001, performs the lexical analysis and the syntax analysis, and converts the source code C009 into a structure graph M017 of FIG. 22 as the non-refactored source code information 1001. Further, the source code input unit 1101 receives the source code C010 as the refactored source code 0002, performs the lexical analysis and the syntax analysis, and converts the source code C010 into a structure graph M018 of FIG. 23 as the refactored source code information 1002. Here, the non-refactored source code information 1001 corresponds to the structure graph M017, and the refactored source code information 1002 corresponds to the structure graph M018.

Next, the step S103 of inputting information related to the refactoring pattern will be described.

In the input unit 1100, the refactoring pattern input unit 1102 receives the refactoring pattern input information 0003, and generates the refactoring pattern information 1003. In this example, for example, when the refactoring pattern input information 0003 is the character string "ParameterizedMethod" or a selection number of a menu of a screen indicating the refactoring pattern ParameterizedMethod, the refactoring pattern information 1003 serving as the code indicating the refactoring pattern ParameterizedMethod is internally generated with reference to the refactoring pattern registration information 1120.

Next, the change position specifying step S1041 of FIG. 5 will be described.

The change position specifying unit 1201 of the normalizing unit 1200 specifies the change position on the source code based on the non-refactored source code information 1001, the refactored source code information 1002, and the refactoring pattern information 1003 with reference to the corresponding change position specifying information 1007*b* registered in the normalization DB 1601, and outputs the change position information 1004. In the example of the refactoring pattern ParameterizedMethod, the refactoring pattern ParameterizedMethod, in view of a feature in which the function in the refactored source code information 1002 increases, the function declarations of the non-refactored source code information 1001 and the refactored source code information 1002 are compared, and a function declaration node appearing only in the refactored source code information 1002 is specified as the change position information. Further, a node calling the function appearing only in the refactored source code information 1002 is also specified as the change position information 1004. In FIGS. 22 and 23, an entry node indicating a function in the structure graph M017 of the non-refactored source code information 1001 is compared with an entry node indicating a function in the structure graph M018 of the refactored source code information 1002, and since a function baz of an entry node indicated by the node M019 increases, a node M019 corresponds to the change position information 1004. Further, nodes M020 and M021 calling the function baz also correspond to the change position information 1004.

Next, the source code information normalization step S1042 of FIG. 5 will be described. The source code normalizing unit 1202 of the normalizing unit 1200 performs the normalization based on the change position information 1004 and the non-refactored source code information 1001 using the corresponding normalization information 1007a stored in the normalization DB 1601, and generates the normalized non-refactored source code information 1005. The refactored source code information 1002 similarly performs the normalization, and generates the normalized refactored source code information 1006 as well. According to the normalization information 1007a corresponding to the refactoring pattern ParameterizedMethod serving as the refactoring pattern information 1003, the normalization method causes the extracted function identified by the change position 1004 in the refactored source code information 0002 to have a structure indicating the source code that has undergone in-line expansion. FIG. 24 illustrates an example in which the source code normalizing unit 1202 performs the normalization on the refactored source code information 1002.

In FIG. 24, the change position is the node M019, the node M020, and the node M021 in the structure graph M018 of the refactored source code information 1002, and these nodes are the declaration and calling positions of the function baz extracted by the refactoring, and thus when the normalization and the in-line expansion are performed on the function baz, a structure graph M022 is obtained. The structure graph M022 corresponds to the normalized refactored source code information 1006. Since the normalized non-refactored source code information 1005 does not undergo the normalization process in connection with the refactoring pattern ParameterizedMethod, the structure graph M017 of the non-refactored source code information 1001 does not change in the normalization and becomes the normalized non-refactored source code information 1005.

Next, the structure comparison step S1043 of FIG. 5 will be described. The structure comparison verification processing unit 1300 receives the normalized non-refactored source code information 1005 and the normalized refactored source code information 1006, compares the structures of the source code information, and generates a result thereof as the structure comparison result 1008. In the example of FIG. 21 in which the refactoring based on the refactoring pattern Parameterized Method is performed, the structure comparison verification processing unit 1300 compares two graphs, that is, the graph M017 of the normalized non-refactored source code information 1005 and the graph M022 of the normalized refactored source code information 1006, and since the graph structures are explicitly different, the non-refactored source code and the refactored source code are determined to be non-equivalent because the structures are different as the structure comparison result 1008.

Next, the symbolic execution implementation determination step S1047 of FIG. 5 will be described. In the example of the refactoring, the symbolic execution implementation determining unit 1700 generates a command of the symbolic execution start instruction 1009 since the source codes are determined to be non-equivalent as the structure comparison result 1008.

Next, the source code information abstraction step S1044 of FIG. 5 will be described. When the symbolic execution start instruction 1009 is received, the symbolic execution verification processing unit 1400 abstracts the normalized non-refactored source code information 1005 and the normalized refactored source code information 1006 through the abstracting unit 1401 using the abstraction information 1010 in which the change position information 1004 and the abstraction method of the abstraction DB 1602 are recorded. An appropriate abstraction technique is recorded in the abstraction information 1010 of the abstraction DB 1602 in association with the refactoring pattern information 1003 and the change position information 1004. In the example in which the refactoring pattern information 1003 is the refactoring pattern ParameterizedMethode, the graph M017 serving as the normalized non-refactored source code information 1005 is compared with the graph M022 serving as the normalized refactored source code information 1006 with reference to the abstraction DB 1602, and the abstraction information 1010 in which the fact that all positions having the same graph structure are deleted is described is acquired. FIG. 25 illustrates a result of applying the abstraction information 1010 to the graph M017 serving as the normalized non-refactored source code information 1005 and the graph M022 serving as the normalized refactored source code information 1006 through the abstracting unit 1401. When the graph indicating the function foo 1 of the graph M017 serving as the normalized non-refactored source code information 1005 is compared with the graph indicating the function foo 1 of the graph M022 serving as the normalized refactored source code information 1006, a node M023 of the graph M017 calling the function bar is identical to a node M025 of the graph M022, and a node M024 of the graph M017 calling the function qux is identical to a node M026 of the graph M022. Thus, when the nodes are deleted, and the positions having the same graph structure are deleted similarly in connection with the function foo 2, the graph M017 serving as the normalized non-refactored source code information 1005 is abstracted to a graph M027, and the graph M022 serving as the normalized refactored source code information 1006 is abstracted to a graph M028. The graph M027 corresponds to the abstracted non-refactored source code information 1403, and the graph M028 corresponds to the abstracted refactored source code information 1404. Here, it is noted that when the number of nodes is reduced, and the symbolic execution is executed on each of the structure graphs M017 and M022, the complexity is reduced by the abstraction.

Next, the symbolic execution step S1045 of FIG. 5 will be described. In the symbolic execution verification processing unit 1400, after the abstraction is performed by the abstracting unit 1401, the symbolic execution unit 1402 executes the symbolic execution on each of the abstracted non-refactored source code information 1403 and the abstracted refactored source code information 1404, and the pre-refactoring symbolic execution result 1405 and the post-refactoring symbolic execution result 1406 are consequently generated. FIG. 26 illustrates a result of executing the symbolic execution on the functions foo 1 of the abstracted non-refactored source code information 1403 and the abstracted refactored source code information 1404 through the symbolic execution unit 1402 in the example of the refactoring. In the example of the refactoring, the abstracted non-refactored source code information 1403 corresponds to the structure graph M027 of FIG. 25. When the symbolic execution is performed on the structure graph M027, an execution tree E300 of FIG. 26 is obtained. Further, in the execution tree E300 of FIG. 26, a symbolic execution summary E301 is the pre-refactoring symbolic execution result 1405 for the abstracted non-refactored source code information 1403. In the example of the refactoring of FIG. 21, the abstracted refactored source code information 1404 corresponds to the structure graph M028 of FIG. 25, and when the symbolic execution is performed on the structure graph M028, an execution tree E400 of FIG. 26 is obtained. Further, in the execution tree E400 of FIG. 26, symbolic execution summaries E401 and E402 are the post-refactoring symbolic execution result 1406 for the abstracted refactored source code information 1404. For the function foo 2, the symbolic execution unit 1402 similarly performs the symbolic execution on the abstracted non-refactored source code information 1403 and the abstracted refactored source code information 1404. For the abstracted non-refactored source code information 1403, the execution tree E350 is generated, and a symbolic execution summary E351 in the execution tree E350 is the pre-refactoring symbolic execution result 1405. For the abstracted refactored source code information 1404, an execution tree E450 is generated, and symbolic execution summaries E451 and E452 are the post-refactoring symbolic execution result 1406.

Next, the symbolic execution result comparison step S1046 of FIG. 5 will be described. The symbolic execution result comparing unit 1407 of the symbolic execution verification processing unit 1400 compares the pre-refactoring symbolic execution result 1405 and the post-refactoring symbolic execution result 1406, and determines whether the non-refactored source code and the refactored source code are equivalent or non-equivalent. In the example of the refactoring of FIG. 21, the pre-refactoring symbolic execution result 1405 for the function foo 1 is E301, and the post-refactoring symbolic execution result 1406 is E401 and E402. The two symbolic execution results are compared using the SAT solver, and thus the symbolic execution result comparing unit 1407 determines that the source codes are equivalent for the function foo 1. In this example, the symbolic execution summaries are understood to be equivalent from the fact that the path constraint of E402 is a contradictory formula, and thus E402 may be considered not to exist or the fact that the variable states of E301 and E401 are identical, and all the path constraints are a valid formula. At this time, there is a structural difference between the pre-refactoring symbolic execution tree E300 and the post-refactoring symbolic execution tree E400, but since the final symbolic execution summaries of the symbolic execution are logically equivalent, the source codes are determined to be equivalent. The symbolic execution result comparing unit 1407 similarly performs the comparison on the function foo 2, and determines that the symbolic execution summaries are equivalent. The symbolic execution summaries for the function foo 2 are understood to be equivalent from the fact that since the path constraint of E451 is a contradictory formula, E451 may be considered not to exist or the fact that the variable states of E351 and E452 are identical, and all the path constraints are a valid formula. The symbolic execution result comparing unit transfers the determination result to the output unit 1500.

Next, the equivalence/non-equivalence output step S105 of FIG. 5 will be described. The output unit 1500 receives the result of determining that the source codes are equivalent through the symbolic execution result comparing unit 1407, and outputs information indicating the source codes are equivalent as the verification result 0004. FIG. 27 illustrates an example of the verification result 0004 output by the output unit 1500.

In a display example illustrated in FIG. 27, the determination is performed by the symbolic execution, and as a result, a determination result P300 indicating the equivalence is obtained. A structure graph P311 of the normalized non-refactored source code information 1005 that has undergone the normalization and a structure graph P312 of the normalized refactored source code information 1006 are displayed as structure graph data used for the structure comparison. In the structure graphs P311 and P312, nodes determined to be different as a result of structure comparison are displayed in a different color, and thus a portion of the source code which is determined to be not equivalent as a result of structure comparison is understood. Further, how the normalization has been performed is understood by viewing the structure graph.

In FIG. 27, "Parameterized Method" serving as an applied normalization refactoring pattern, baz serving as information of a target function name, and file names and line numbers serving as applied position information to which the refactoring is applied before and after the refactoring is applied are displayed as refactoring-applied information P320. Thus, the developer can check whether or not the refactoring pattern and the applied position executed by the equivalence verification device are identical to a desired result.

In the display example illustrated in FIG. 27, symbolic execution summary information P330 for the non-refactored source code and symbolic execution summary information P331 for the refactored source code are displayed as information specific to the determination by the symbolic execution. In the symbolic execution summary information P330 and P331, the path constraints and the variable states in E301, E351, and E401, E402, E451, and E452 are displayed line by line. Thus, the developer can understand the symbolic execution result and understand the logical expression that is used for the equivalence determination. Further, the user can determine that the refactoring is valid.

The display example illustrated in FIG. 27 is a display example when the equivalence determination is performed by the symbolic execution. When the non-equivalence is determined by the symbolic execution, counter example information is also displayed in addition to the information illustrated in FIG. 27. The counter example information is an example of an input indicating that the symbolic execution summary before the refactoring is not equivalent the symbolic execution summary after the refactoring, which is obtained by the SAT solver. As the counter example information is displayed, the developer can understand an input for which the non-refactored source code and the refactored source code have different outputs. Thus, it is possible to analyze the ground for inappropriate refactoring.

In this example, since the structural difference on the structure graph serving as the source code information occurs due to the determination of S1047, the symbolic execution needs to be performed to verify that the source codes are equivalent, but since the source code information abstraction is performed, and the source code information is reduced, it is possible to reduce the complexity in the symbolic execution process.

REFERENCE SIGNS LIST

0001 Non-refactored source code
0002 Refactored source code
0003 Refactoring pattern
0004 Verification result
101 CPU
102 main storage device
103 Network I/F 104 Graphic I/F
105 Input/output I/F
106 Auxiliary storage device I/F
110 Control unit
120 Display/output device
130 Input device
131 Keyboard
132 Mouse
141 Hard disk drive (HDD)
142 DVD drive device
150 External network
160 External computer
200 Source code equivalence verification program
1000 Source code equivalence verification device
1100 Input unit
1120 Refactoring pattern registration information
1200 Normalizing unit
1300 Structure comparison verification processing unit
1400 Symbolic execution verification processing unit
1500 Output unit
1600 Storage unit
1601 Normalization database
1602 Abstraction database
1603 Non-refactored/refactored source code storage region
1604 Non-refactored/refactored source code information storage region
1605 Pre-/post-refactoring symbolic execution result storage region
1606 Verification result storage region
1700 Symbolic execution implementation determining unit
1001 Non-refactored source code information
1002 Refactored source code information
1003 Refactoring pattern information
1004 Change position information
1005 Normalized and non-refactored source code information
1006 Normalized refactored source code information
1007a Normalization information
1007b Change position specifying information
1008 Structure comparison result
1009 Symbolic execution start instruction
1010 Abstraction information
1101 Source code input unit
1102 Refactoring pattern input unit
1201 Change position specifying unit
1202 Source code normalizing unit
1401 Abstracting unit
1402 Symbolic execution unit
1403 Abstracted non-refactored source code information
1404 Abstracted refactored source code information
1405 Pre-refactoring symbolic execution result
1406 Post-refactoring symbolic execution result
1407 Symbolic execution result comparing unit
1601 Normalization database
1602 Abstraction database
S101 Non-refactored source code input step
S102 Refactored source code input step
S103 Refactoring pattern input information input step
S1041 Change position specifying step
S1042 Source code information normalization step
S1043 Structure comparison step
S1044 Source code abstraction step
S1045 Symbolic execution step
S1046 Symbolic execution result comparison step
S1047 Symbolic execution implementation determination step
S105 Equivalence/non-equivalence output step C001 Source code before refactoring is applied
C002 Source code after refactoring is applied
C003 Source code before refactoring is applied
C004 Source code after refactoring is applied
C005 First half of source code in function foo in C003
C006 Second half of source code in function foo in C003
C007 First half of source code in function foo in C004
C008 Second half of source code in function foo in C004
C009 Source code before refactoring is applied
C010 Source code after refactoring is applied
C011 First half of source code in function foo1 in C009
C012 Second half of source code in function foo1 in C009
C013 First half of source code in function foo2 in C009
C014 Second half of source code in function foo2 in C009
C015 First half of source code in function foo1 in C010
C016 Second half of source code in function foo1 in C010
C017 First half of source code in function foo2 in C010
C018 Second half of source code in function foo2 in C010
C019 First half of source code in function baz in C010
C020 Second half of source code in function baz in C010
E001 Source code for describing symbolic execution
E002 Structure graph of source code
E003 Node indicating entry of function foo in structure graph
E004 Node of transition destination of E003 in structure graph
E005 Node of transition destination of E004 in structure graph
E006 Node of branch destination of E005 in structure graph
E007 Node of branch destination of E005 in structure graph
E008 Node of transition destination of E006 and E007 in structure graph
E009a Node of branch destination of E008 in structure graph
E009b Node of branch destination of E008 in structure graph
E010 Execution tree node corresponding to E003
E010a Path constraint of E010
E010b Variable state of E010
E011 Execution tree node corresponding to E004
E011a Path constraint of E011
E011b Variable state of E011
E012 Execution tree node corresponding to E006
E012a Path constraint of E012
E012b Variable state of E012
E013 Execution tree node corresponding to E007
E013a Path constraint of E013
E013b Variable state of E013
E014 Execution tree node corresponding to E009 when passing through E006
E015 Execution tree node corresponding to E009a when passing through E006
E016 Execution tree node corresponding to E009 when passing through E007
E017 Execution tree node corresponding to E009a when passing through E007
E020 Execution tree of symbolic execution
E100 Execution tree of symbolic execution of source code information before refactoring is applied
E101 Node included in symbolic execution summary in E100
E102 Node included in symbolic execution summary in E100
E103 Node included in symbolic execution summary in E100
E104 Node included in symbolic execution summary in E100

E200 Execution tree of symbolic execution of source code information after refactoring is applied
E201 Node included in symbolic execution summary in E200
E202 Node included in symbolic execution summary in E200
E203 Node included in symbolic execution summary in E200
E204 Node included in symbolic execution summary in E200
E300 Execution tree of symbolic execution for abstracted source code information of function foo1 before refactoring is applied
E301 Node included in symbolic execution summary in E300
E350 Execution tree of symbolic execution for abstracted source code information of function foo2 before refactoring is applied
E351 Node included in symbolic execution summary in E350
E400 Execution tree of symbolic execution for abstracted source code information of function foo1 after refactoring is applied
E401 Node included in symbolic execution summary in E400
E402 Node included in symbolic execution summary in E400
E450 Execution tree of symbolic execution for abstracted source code information of function foo2 after refactoring is applied
E451 Node included in symbolic execution summary in E450
E452 Node included in symbolic execution summary in E450
M001 Structure graph of source code before refactoring is applied
M002 Structure graph of source code after refactoring is applied
M003 Node indicating function added by refactoring
M004 Node calling function added by refactoring
M005 Structure graph of normalized source code information before refactoring is applied
M006 Structure graph of normalized source code information after refactoring is applied
M007 Link of result of developing function by normalization
M008 Structure graph of source code before refactoring is applied
M009 Structure graph of source code after refactoring is applied
M010 Node indicating function var in M008
M011 Node calling function var in M008
M012 Node indicating function var in M009
M013 Node calling function var in M009
M014 Structure graph of abstracted source code information before refactoring is applied
M015 Structure graph of abstracted source code information after refactoring is applied
M016 Node indicating abstracted position in M014
M017 Structure graph of source code before refactoring is applied
M018 Structure graph of source, code after refactoring is applied
M019 Node indicating function added by refactoring
M020 Node calling function added by refactoring
M021 Node calling function added by refactoring
M022 Structure graph of normalized source code information after refactoring is applied
M023 Node calling function bar in M017
M024 Node calling function qux1 in M017
M025 Node calling function bar in M022
M026 Node calling function qux1 in M022
P100 Determination result in verification result display of equivalence verification for C001 and C002
P111 Structure graph of normalized C001 in verification result display of equivalence verification for C001 and C002
P112 Structure graph of normalized C002 in verification result display of equivalence verification for C001 and C002
P120 Refactoring-applied information in verification result display of equivalence verification for C001 and C002
P200 Determination result in verification result display of equivalence verification for C003 and C004
P211 Structure graph of normalized C003 in verification result display of equivalence verification for C003 and C004
P212 Structure graph of normalized C004 in verification result display of equivalence verification for C003 and C004
P220 Refactoring-applied information in verification result display of equivalence verification for C003 and C004
P230 Symbolic execution summary display of C003 in verification result display of equivalence verification for C003 and C004
P231 Symbolic execution summary display of C004 in verification result display of equivalence verification for C003 and C004
P300 determination result in verification result display of equivalence verification for C009 and C010
P311 Structure graph of normalized C009 in verification result display of equivalence verification for C009 and C010
P312 Structure graph of normalized C010 in verification result display of equivalence verification for C009 and C010
P320 Refactoring-applied information in verification result display of equivalence verification for C009 and C010
P330 Symbolic execution summary display of C009 in verification result display of equivalence verification for C009 and C010
P331 Symbolic execution summary display of C010 in verification result display of equivalence verification for C009 and C010

The invention claimed is:
1. A source code equivalence verification device that verifies equivalence between an original source code and a source code after refactoring execution, comprising:
a processor; and
a storage device that stores instructions that cause the processor to execute:
a source code input unit that receives a non-refactored source code and a refactored source code;
a refactoring pattern input unit that receives refactoring pattern information of the source code;
a source code information generating unit that performs lexical analysis and syntax analysis on each of the non-refactored source code and the refactored source code, converts the non-refactored source code and the refactored source code into structure graphs, and generates non-refactored source code information and refactored source code information;

a normalizing unit that normalizes the non-refactored source code information and the refactored source code information with reference to normalization information defined for refactoring pattern information, and generates normalized non-refactored source code information and normalized refactored source code information;

a structure comparing unit that compares a structure of the normalized non-refactored source code information with a structure of the normalized refactored source code information;

a symbolic execution unit that performs symbolic execution on the normalized non-refactored source code information and the normalized refactored source code information; and an equivalence determining unit that compares symbolic execution results obtained by the symbolic execution unit, and determines equivalence between the non-refactored source code and the refactored source code, wherein the normalizing unit further includes a change position specifying unit that compares the non-refactored source code information with the refactored source code information with reference to change position specifying information defined for the refactoring pattern information, and generates change position information specifying a structural change position of a source code, the symbolic execution unit further includes an abstracting unit that abstracts the normalized non-refactored source code information and the normalized refactored source code information with reference to change position information of the non-refactored source code information and the refactored source code information extracted by the change position specifying unit and abstraction information defined for the refactoring pattern information, and the symbolic execution is performed on abstracted non-refactored source code information and abstracted refactored source code information generated by the abstracting unit.

2. The source code equivalence verification device according to claim 1, wherein the structure comparing unit compares a structure graph of the normalized non-refactored source code information with a structure graph of the normalized refactored source code information, determines that the non-refactored source code and the refactored source code are equivalent when the structures are identical, and ends an equivalence verification process, and when the structures are determined to be not identical, the symbolic execution is performed.

3. The source code equivalence verification device according to claim 1, wherein, after an abstraction process defined for each of the refactoring pattern information is executed on the normalized non-refactored source code information and the normalized refactored source code information, the symbolic execution unit generates an execution tree, obtains a logical product of a path constraint and a variable state of each of all leaf nodes, obtains a logical sum of the logical products of all the leaf nodes, and calculates a logical expression indicating a symbolic execution summary, and the equivalence determining unit determines whether or not the logical expression indicating the symbolic execution summary of the normalized non-refactored source code information calculated by the symbolic execution unit is logically equivalent to the logical expression indicating the symbolic execution summary of the normalized refactored source code information.

4. The source code equivalence verification device according to claim 1, further comprising, a verification result output unit that comparatively displays the structure graph of the normalized non-refactored source code information and the structure graph of the normalized refactored source code information on a display screen together with a source code equivalence verification result, and comparatively displays symbolic execution summary information for a non-refactored source code and symbolic execution summary information for a refactored source code or outputs all display information to an output device.

5. The source code equivalence verification device according to claim 4, wherein the verification result output unit further displays or outputs counter example information when the equivalence determining unit determines that the logical expression of the normalized non-refactored source code information is not logically equivalent to the logical expression of the normalized refactored source code information.

6. A source code equivalence verification method of verifying equivalence between an original source code and a source code after refactoring execution, comprising:

a source code input step of receiving a non-refactored source code and a refactored source code;

a refactoring pattern input step of receiving refactoring pattern information of the source code;

a source code information generation step of performing lexical analysis and syntax analysis on each of the non-refactored source code and the refactored source code, converting the non-refactored source code and the refactored source code into structure graphs, and generating non-refactored source code information and refactored source code information;

a normalization step of normalizing the non-refactored source code information and the refactored source code information with reference to normalization information defined for refactoring pattern information, and generating normalized non-refactored source code information and normalized refactored source code information;

a structure comparison step of comparing a structure of the normalized non-refactored source code information with a structure of the normalized refactored source code information;

a symbolic execution step of performing symbolic execution on the normalized non-refactored source code information and the normalized refactored source code information; and an equivalence determination step of comparing symbolic execution results obtained by the symbolic execution step, and determining equivalence between the non-refactored source code and the refactored source code, wherein the normalization step further includes a change position specifying step of comparing the non-refactored source code information with the refactored source code information with reference to change position specifying information defined for the refactoring pattern information, and generating change position information specifying a structural change position of a source code, the symbolic execution step further includes an abstraction step of abstracting the normalized non-refactored source code information and the normalized refactored source code information with reference to change position information of the non-refactored source code information and the refactored source code information extracted by the change position specifying step and abstraction information defined for the refactoring pattern information, and the symbolic execution is performed on abstracted non-refactored source code information and abstracted refactored source code information generated in the abstraction step.

7. The source code equivalence verification method according to claim 6, wherein, in the structure comparison step, the structure graph of the normalized non-refactored source code information is compared with the structure graph of the normalized refactored source code information, the non-refactored source code and the refactored source code are determined to be equivalent when the structures are identical, and an equivalence verification process ends, and when the structures are determined to be not identical, the symbolic execution unit is performed.

8. The source code equivalence verification method according to claim 6, wherein in the symbolic execution step, after an abstraction process defined for each of the refactoring pattern information is executed on the normalized non-refactored source code information and the normalized refactored source code information, an execution tree is generated, a logical product of a path constraint and a variable state of each of all leaf nodes is obtained, a logical sum of the logical products of all the leaf nodes is obtained, and a logical expression indicating a symbolic execution summary is calculated, and in the equivalence determination step, it is determined whether or not the logical expression indicating the symbolic execution summary of the normalized non-refactored source code information calculated in the symbolic execution step is logically equivalent to the logical expression indicating the symbolic execution summary of the normalized refactored source code information.

9. The source code equivalence verification method according to claim 6, further comprising, a verification result output step of comparatively displaying the structure graph of the normalized non-refactored source code information and the structure graph of the normalized refactored source code information on a display screen together with a source code equivalence verification result, and comparatively displaying symbolic execution summary information for a non-refactored source code and symbolic execution summary information for a refactored source code or outputting all display information to an output device.

10. The source code equivalence verification method according to claim 9, wherein in the verification result output step, counter example information is further displayed or output when it is determined in the equivalence determination step that the logical expression of the normalized non-refactored source code information is not logically equivalent to the logical expression of the normalized refactored source code information.

* * * * *